United States Patent
Cere' et al.

(10) Patent No.: US 9,625,083 B2
(45) Date of Patent: Apr. 18, 2017

(54) SYSTEM FOR MOVING OPERATING UNITS OF A WRAPPING MACHINE, WRAPPING METHOD AND WRAPPING MACHINE

(75) Inventors: Mauro Cere', Loiano (IT); Mirko Casalboni, Rimini (IT)

(73) Assignee: Aetna Group, S.p.A. (IT)

( * ) Notice: Subject to any disclaimer, the term of this patent is extended or adjusted under 35 U.S.C. 154(b) by 575 days.

(21) Appl. No.: 14/238,484

(22) PCT Filed: Aug. 14, 2012

(86) PCT No.: PCT/IB2012/054130
§ 371 (c)(1),
(2), (4) Date: Feb. 12, 2014

(87) PCT Pub. No.: WO2013/024429
PCT Pub. Date: Feb. 21, 2013

(65) Prior Publication Data
US 2014/0217258 A1  Aug. 7, 2014

(30) Foreign Application Priority Data

Aug. 16, 2011  (IT) .............................. MO2011A0212
Aug. 16, 2011  (IT) .............................. MO2011A0213

(51) Int. Cl.
*F16M 11/18*  (2006.01)
*B65B 11/02*  (2006.01)
(Continued)

(52) U.S. Cl.
CPC .............. *F16M 11/18* (2013.01); *B61B 13/04* (2013.01); *B65B 11/025* (2013.01);
(Continued)

(58) Field of Classification Search
CPC ....... F16M 11/18; B61B 13/04; B65B 11/045; B65B 11/025; B65B 59/04; B65B 13/181; B65B 13/182; B65B 2210/20
(Continued)

(56) References Cited

U.S. PATENT DOCUMENTS 4,905,448 A  *  3/1990  Plitt ...................... B65B 11/025
                                                            53/176
5,040,359 A  *  8/1991  Thimon ................ B65B 11/025
                                                            53/389.4
(Continued)

FOREIGN PATENT DOCUMENTS

DE         19505240 C1     3/1996

*Primary Examiner* — Hemant M Desai
*Assistant Examiner* — Mobeen Ahmed
(74) *Attorney, Agent, or Firm* — Laubscher, Spendlove & Laubscher, P.C.

(57) ABSTRACT

The invention relates to a movement system that is associated with a wrapping machine for wrapping a load with a film including at least one operating unit for performing operations on the load or on the film. The system includes shuttles that are movable for supporting and moving the operating units along a path at least between an operating position in which the operating units can perform operations on the load or on the film or can interact with the wrapping machine, and a inactive position in which the operating units are outside a working zone of the wrapping machine in order not to interfere with the operation thereof.

12 Claims, 18 Drawing Sheets

(51) Int. Cl.
  *B65B 11/04* (2006.01)
  *B61B 13/04* (2006.01)
  *B65B 59/04* (2006.01)
  *B65B 13/18* (2006.01)

(52) U.S. Cl.
  CPC .......... *B65B 11/045* (2013.01); *B65B 13/181* (2013.01); *B65B 13/182* (2013.01); *B65B 59/04* (2013.01); *B65B 2210/20* (2013.01)

(58) Field of Classification Search
  USPC ...... 53/588, 203, 167, 556, 139.7, 210, 218, 53/136.1
  See application file for complete search history.

(56) References Cited

U.S. PATENT DOCUMENTS

| | | | | |
|---|---|---|---|---|
| 5,315,809 | A * | 5/1994 | Gordon | B65B 11/025 53/399 |
| 5,515,666 | A * | 5/1996 | Berger | B30B 9/3032 53/529 |
| 6,170,233 | B1 * | 1/2001 | Marois | B65B 11/025 53/399 |
| 6,553,746 | B1 * | 4/2003 | Cere' | B65B 11/025 53/389.1 |
| 2002/0162436 | A1 * | 11/2002 | Marois | B65B 11/025 83/13 |
| 2002/0189210 | A1 * | 12/2002 | Wiley | B65B 11/008 53/556 |
| 2003/0051439 | A1 * | 3/2003 | Lancaster, III | B65B 11/025 53/399 |
| 2003/0093973 | A1 * | 5/2003 | Mir | B65B 11/025 53/399 |
| 2004/0099110 | A1 * | 5/2004 | Cere | B65B 69/0033 83/78 |
| 2005/0081491 | A1 * | 4/2005 | Rimondi | B65B 11/54 53/556 |
| 2005/0193687 | A1 | 9/2005 | Tosa | |
| 2006/0000193 | A1 * | 1/2006 | Naeyaert | A01F 15/071 53/587 |
| 2007/0189762 | A1 * | 8/2007 | Cere | B65B 11/025 396/320 |
| 2007/0220832 | A1 * | 9/2007 | Dussault | B65B 9/14 53/441 |
| 2008/0092486 | A1 | 4/2008 | Cere' | |
| 2008/0229707 | A1 * | 9/2008 | Zitella | B65B 11/025 53/64 |
| 2010/0018165 | A1 * | 1/2010 | Kudia | B65B 11/025 53/465 |
| 2011/0219960 | A1 * | 9/2011 | Jowett | B65B 13/02 100/2 |
| 2012/0055123 | A1 * | 3/2012 | Brunson | B65B 9/135 53/558 |

\* cited by examiner

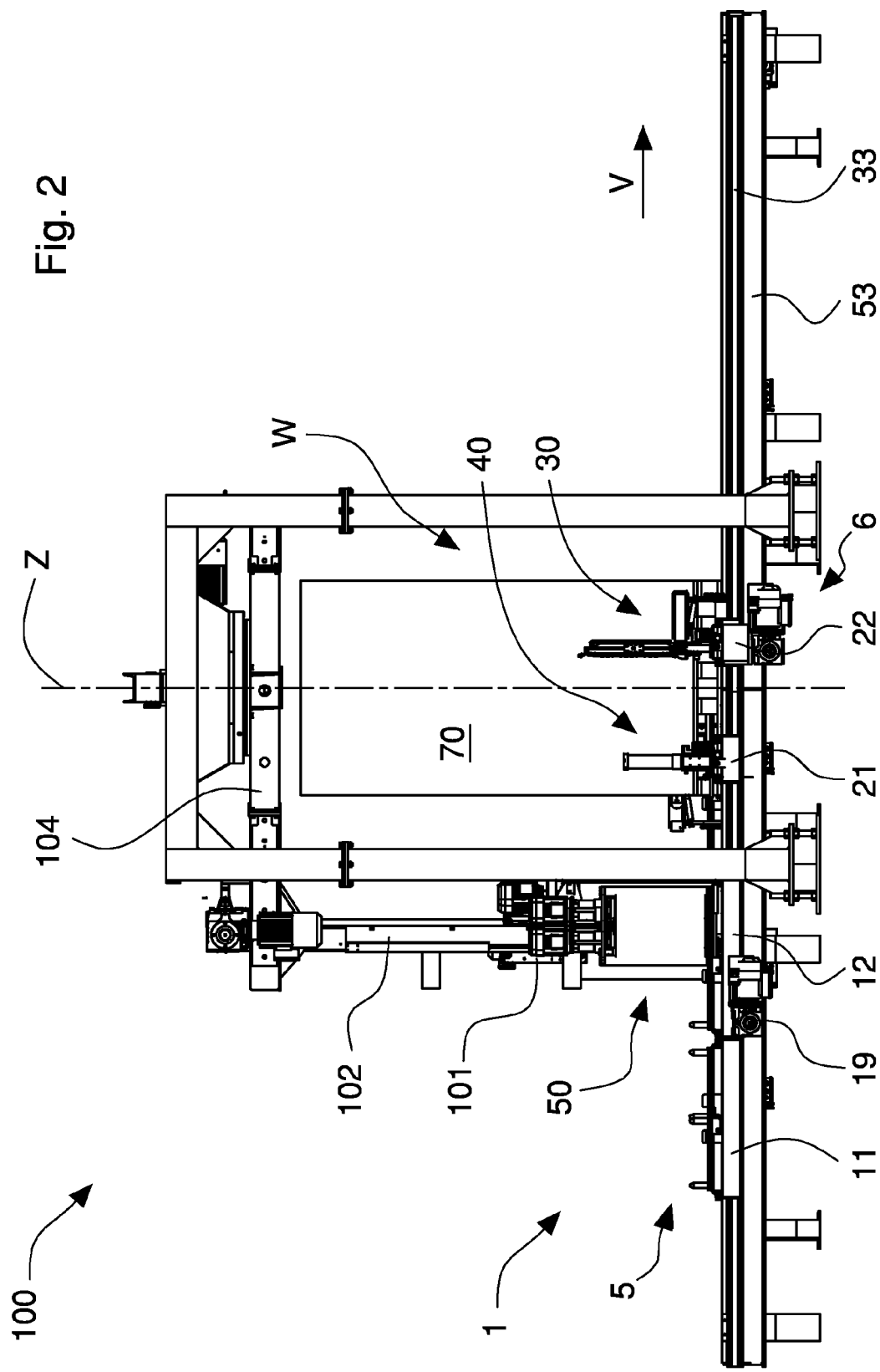

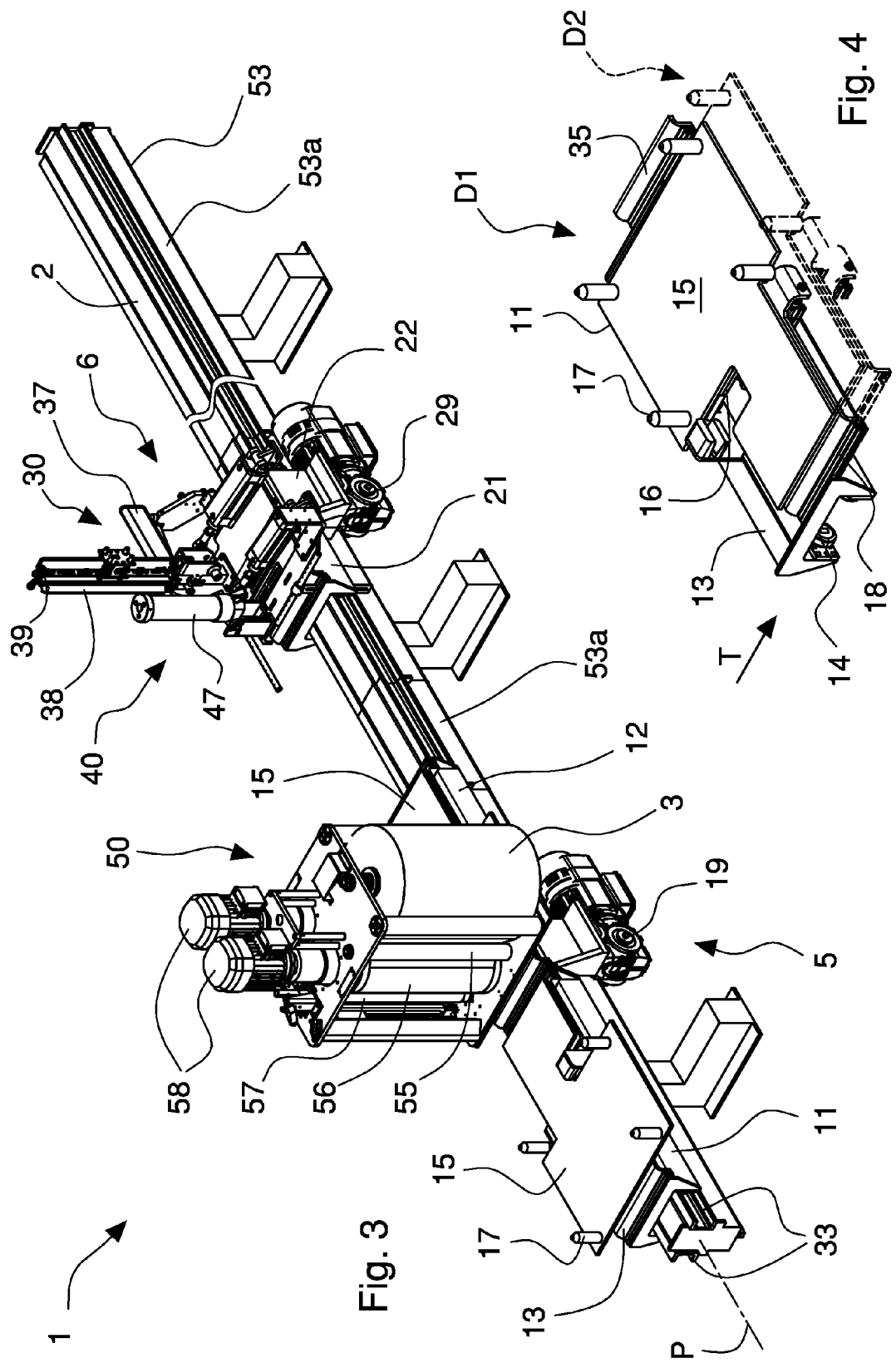

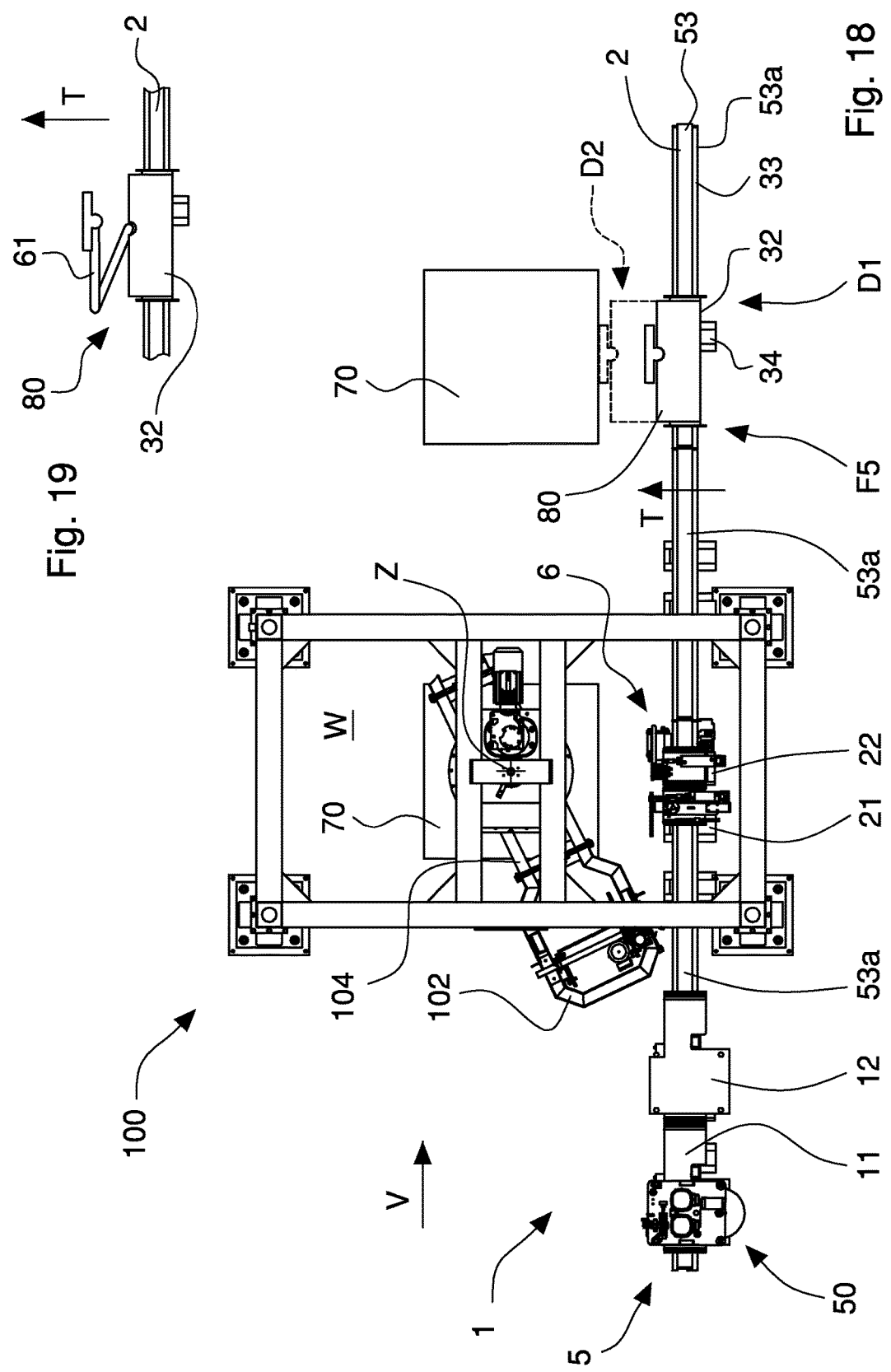

SYSTEM FOR MOVING OPERATING UNITS OF A WRAPPING MACHINE, WRAPPING METHOD AND WRAPPING MACHINE

This application is a §371 National Stage of PCT International Application No. PCT/IB2012/054130. PCT/IB2012/054130 claims priority to IT Application Nos. MO2011A000212 and MO2011A000213 filed Aug. 16, 2011. The entire contents of these applications are incorporated herein by reference.

BACKGROUND OF THE INVENTION

The invention relates to machines and methods for wrapping a load with a film of extendible synthetic plastic material. In particular, the invention relates to a movement system that is associated with a wrapping machine for moving operating units of the latter, for example, units for unwinding and prestretching the film, for gripping, cutting and welding the film, for labelling the load and/or the film, for printing the film, for inserting angular guards, etc. The invention also relates to a machine and a method for wrapping a load with an extendible film of synthetic plastic material.

BRIEF DESCRIPTION OF THE PRIOR ART

Known wrapping machines include an unwinding unit that supports a reel from which the film of synthetic plastic material is unwound and possibly stretched to then be wrapped around the load in such a manner as to form a series of helical strips or bands, by virtue of the combination of movement in a vertical direction of the unwinding unit and of the reciprocal rotation between the latter and the load. The load typically includes one or more products grouped and arranged on a pallet.

In wrapping machines provided with a rotating table supporting the load, the load is rotated around a vertical wrapping axis, whereas the unwinding unit is fixed to a carriage that is movable vertically with reciprocating motion along a fixed column.

In wrapping machines with a horizontal rotating ring or a rotating arm the load remains fixed during wrapping while the unwinding unit is rotated with respect to the latter around the vertical wrapping axis and is translated along the vertical wrapping axis. For this purpose, the unwinding unit is fixed to a ring, or to an arm, rotatably supported by a fixed structure of the machine and in such a manner as to rotate around the load.

In vertical rotating ring wrapping machines, the load is moved horizontally through the ring, while the unwinding unit rotates with the ring around a horizontal wrapping axis.

The unwinding unit typically includes a pair of prestretching rollers arranged for unwinding the film from the reel and optionally prestretching or elongating the film, and one or more idler rollers for diverting the film to the load. By appropriately adjusting the difference between the rotation speed of the prestretching rollers it is possible to prestretch, by a defined quantity or percentage, the film and vary the speed of unwinding of the film from the reel.

In addition to the unwinding unit and the corresponding movement system (ring, arm, carriage, etc), known wrapping machines include a plurality of operating units that are necessary for completing the wrapping process and for performing optional and accessory operations.

Such operating units include, for example, devices that, at the end of wrapping, grasp the film, cut the film, stopping the two flaps thereby obtained and fixing by welding a first flap to the load, retaining a second flap, connected to the reel, to permit subsequent wrapping.

Optional operating units include, for example, devices for applying labels or printing data to the film wrapped on the load and for applying reinforcements and guards to the corners of the load.

The aforementioned operating units are fixed to the machine, adjacent to the load to be wrapped, generally fixed to load conveying and supporting devices (roller conveyors, rotating table, etc.).

One drawback of the aforementioned operating units lies in the fact that they considerably increase the space occupied by the wrapping machine and set limits and constraints on the arrangement and positioning thereof in the environment or room in which the machine is installed. Further, as the aforementioned operating units are placed on the machine, maintenance or repair accessibility is limited.

Often, the different operating units cannot be mounted together or can be mounted only with significant structural modifications and/or in operating positions that are not optimum with respect to the machine.

Units can also be defined as operating units that enable the reel of film to be replaced automatically or semi-automatically once it has finished. Alternatively, portions of or the entire unwinding unit to be can be replaced automatically or semi-automatically. Such operating units generally include supporting devices or movement systems suitable for receiving from the wrapping machine a reel or an unwinding unit to be replaced and for supplying a new reel or new unwinding unit to the aforesaid machine.

In addition to the aforementioned drawbacks, known operating units perform their respective operations inefficiently, thereby reducing the productivity of the wrapping machine. For example, once the load has been wrapped by the film it cannot be moved and is thus extracted from the machine before completion of the expected operations (for example, gripping, cutting and welding) and before completion of possible optional operations.

Similarly, the entry and wrapping of a subsequent load cannot occur until the previous load has been removed from the working zone of the wrapping machine.

Processes for replacing the reel or the wrapping unit can be completely automated, but they nevertheless require significant execution time thereby reducing the productivity of the wrapping machine which has to be stopped and cannot perform any operation.

SUMMARY OF THE INVENTION

One object of the invention is to improve known machines and methods for wrapping a load with a film of extendible synthetic plastic material.

Another object is to carry out a movement system that is associated with a wrapping machine for moving operating units of the latter that simultaneously enables different operations and/or functions to be performed so as to increase the productivity of the machine compared with known wrapping machines.

A further object is to carry out a compact and flexible movement system that enables the space occupied by and dimensions of a wrapping machine to be contained and limited with which the movement system is associated and/or included, ensuring at the same time optimum accessibility to the wrapping machine.

A further object is to provide a machine and a method for wrapping a load with a film that optimizes the performance of operations on the load or on the film or of functions performed by the wrapping machine so as to increase the productivity of the wrapping machine.

BRIEF DESCRIPTION OF THE FIGURES

The invention can be better understood and implemented with reference to the attached drawings that illustrate some embodiments thereof by way of non-limiting example, in which:

FIG. 2 is a front view of the movement system and of the wrapping machine in FIG. 1;

FIG. 3 is a rear perspective view of the movement system in FIG. 1;

FIG. 4 is a perspective view of a shuttle of the system in FIG. 3 in a retracted position, and, illustrated partially and in a dashed line, in an extended position;

FIG. 18 is a plan view of the system and of the machine in FIG. 17 in one version of the labelling process;

FIG. 19 is a plan view of a version of a fourth labelling operating unit in FIG. 18;

DETAILED DESCRIPTION

Figure 1:
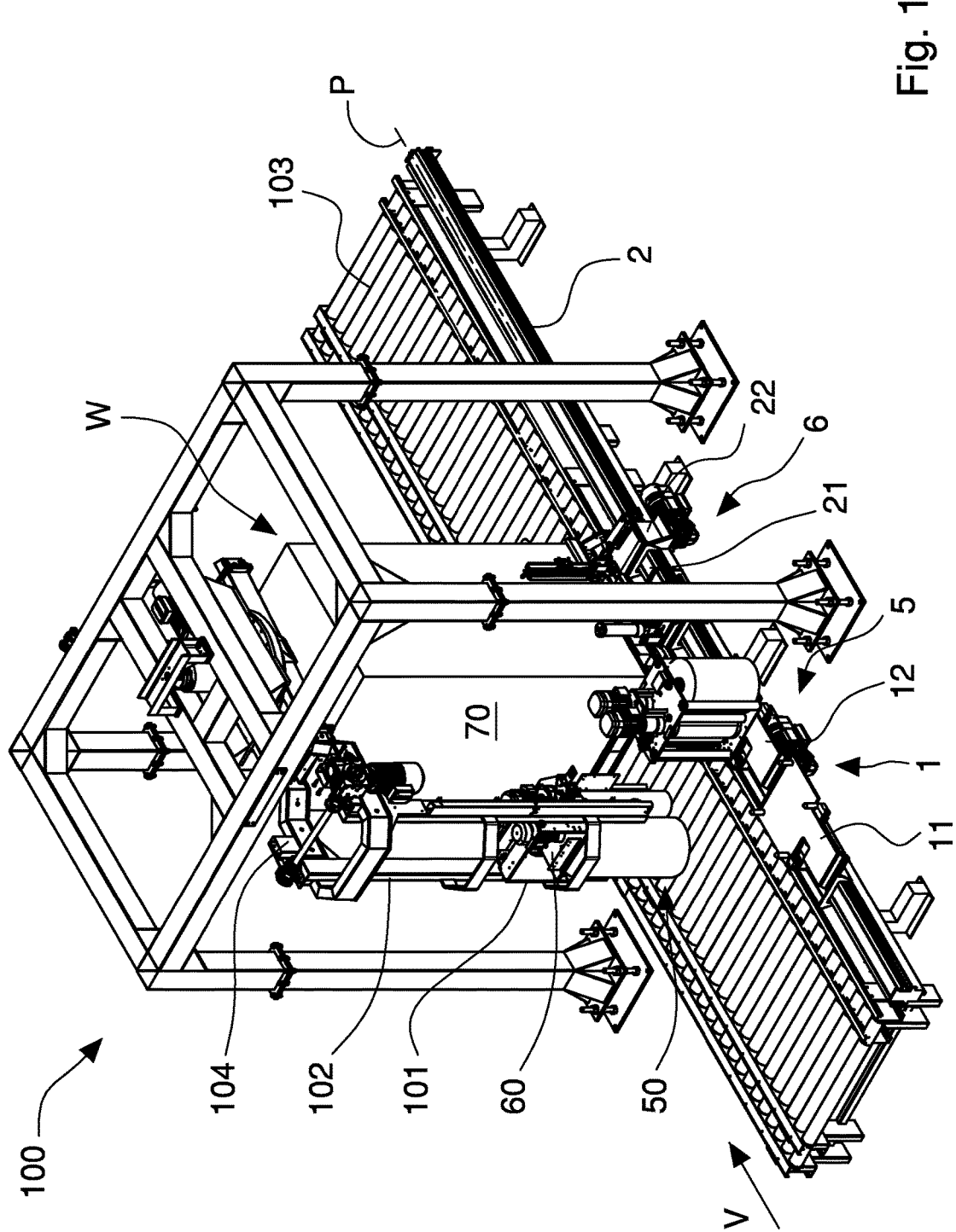
FIG. 1 is a perspective view of the movement system associated with a wrapping machine for moving operating units of the machine.

With reference to FIGS. 1 to 7, there is illustrated a movement system 1 according to the invention, which is associated with a wrapping machine 100 for wrapping a load 70 with a film 4 of stretchable synthetic plastic material, for moving at least one operating unit that is suitable for performing operations on a load 70 that is to be wrapped or has already been wrapped or on the film or on the wrapping machine.

In the embodiment of the figures, the system 1 moves a plurality of operating units 30, 40, 50 arranged for performing distinct operations on the load 70, on the film, and on the wrapping machine. The operating units include, for example, a first operating unit 30 for gripping, cutting and welding the film, a second operating unit 40 for retaining the film and a third operating unit 50 for unwinding the film. The aforementioned operating units 30, 40, 50 are disclosed in detail below.

The wrapping machine 100 is, for example, of the rotating arm type and includes a vertical arm 102 that is rotatable around a wrapping axis Z and slidably supports a wrapping carriage 101 to which a film 4 unwinding operating unit 50 is connected. The vertical arm 102 is fixed to a rotatable crosspiece 104 in such a manner as to rotate around the wrapping axis Z and the load 70. The carriages 101, the vertical arms 102 and the rotatable crosspiece 104 work together to move the third unwinding operating unit 50. The unwinding unit 50 includes at least one reel 3 of film 4, and rollers 55, 56, 57 for unwinding and prestretching the film 4. In the example shown in the figures, the unwinding unit 50 further includes a pair of motors 58 arranged for rotating respective prestretching rollers 55, 56.

As explained in greater detail below, each unwinding unit 50 can be dismantled from the wrapping carriage 101 (for example after the film has finished, has been damaged or has jammed) to be replaced by a respective replacement unwinding unit 50 (with a new and undamaged reel of film) by the movement system 1 of the invention. For this purpose, the wrapping carriage 101 is provided with a supporting unit 60 to and from which an unwinding unit 50 can be connected and disconnected.

The wrapping machine 100 is provided with conveyor 103 for supporting and moving the load 70 along an advancing direction V through the wrapping machine 100 and in particular through a working zone W of the wrapping machine 100 in which the film 4 is wrapped and one or more operations are performed on the load 70, on the film 4, and on the wrapping machine. The conveyor 103 enables a load 70 to be wrapped to be supplied to the machine 100 and a load 70 wrapped with the film 4 to be moved out of the machine. The conveyor 103 includes, for example, one or more driving roller conveyors of known type.

The movement system 1 of the invention includes shuttles 11, 12, 21, 22 that are movable along a path P and configured for supporting at least one operating unit of the wrapping machine 100. The shuttles 11, 12, 21, 22 are slidably supported along the path P by a guide 2.

The guide 2 traverses the working zone W of the wrapping machine 100.

In the embodiment illustrated in FIGS. 1 to 7, the shuttles 11, 12, 21, 22 move a first operating unit 30 for gripping, cutting and welding the film, a second operating unit 40 for retaining the film and a third operating unit 50 for unwinding the film. The first operating unit 30 and the second operating unit 40, at the end of load 70 wrapping, grip the film 4 unwound from the reel 3, cut the film 4, retaining the two free flaps obtained thereby, and fix by welding a first flap to the load 70 by retaining a second flap connected to the reel 3, to permit subsequent wrapping.

As will be explained better below, the shuttles 11, 12, 21, 22 and the conveyor 103 are drivable in a coordinated manner to enable the operating units to perform operations on the load 70 while the latter is moved along the advancing direction V. More precisely, once the load 70 has been wrapped with the film, the shuttles 11, 12, 21, 22 and the conveyor 103 are drivable in a coordinated manner at the same speed to enable the first operating unit 30 to perform operations for gripping, cutting and welding the film on the moving load 70 once the load 70 has been wrapped with the film.

The shuttles 11, 12, 21, 22 are also movable along the path P between one or more operating positions, in which the operating units supported thereby can interact and perform operations on the load 70 and/or on the film and/or on the wrapping machine, and one or more non-operating or inactive positions in which the shuttles 11, 12, 21, 22 and the corresponding operating units are outside the working zone W of the wrapping machine 100 in order not to interfere with the operation of the latter.

For this purpose, the shuttles 11, 12, 21, 22 include driving mechanisms 19, 29 that are able to move the shuttles 11, 12, 21, 22 along the path P.

The shuttles 11, 12 can further include brakes for stopping the shuttles in defined positions along the path P.

The shuttles 11, 12, 21, 22 also include transfer devices 15, 25 that are suitable for receiving and supporting respective operating units 30, 40, 50 and are movable along an operating direction T to enable the operating units 30, 40, 50 to interact with and/or perform operations on the load 70 and/or on the film and/or on the wrapping machine.

The operating direction T is transverse, in particular orthogonal, to the path P. The operating direction T is further substantially horizontal.

The shuttles 11, 12, 21, 22 include at least one shuttle that is provided with a respective driving device for moving along the path P and which is arranged for supporting and moving at least one respective operating unit by respective transfer devices 15, 25. Preferably, the shuttles include a plurality of shuttles 11, 12, 21, 22 each of which is arranged for receiving and moving at least one respective operating unit by respective transferring device 15, 25. The shuttles are connectable together to form at least one convoy of shuttles that are able to move independently along the path P.

For this purpose, each shuttle of the plurality of shuttles includes a hook 35 for connecting to at least one adjacent shuttle to form a convoy of shuttles.

The fixed hook 35 includes, for example, screwable plates or brackets.

The shuttles can be provided with further hooks 36 that are movable and selectively activatable to engage with and disengage from respective further hooks 36 of an adjacent shuttle so as to connect disconnect the shuttles and form or dismantle a convoy of shuttles.

In one embodiment of the movement system that is not illustrated the shuttles include one or more shuttles, each of which is able to receive and move a plurality of operating units by respective transfer device. In particular, the shuttles can include at least one shuttle provided with a plurality of transfer devices for supporting and moving a respective plurality of operating units.

At least one shuttle of the plurality of shuttles is provided with a respective driving device 19, 29 for moving the convoy with which it is associated.

In the embodiment illustrated purely by way of non-limiting example in FIGS. 1 to 7, the shuttles include two shuttles 12, 22 provided with respective driving devices 19, 29, and defined for convenience as driving shuttles, and one or more shuttles 11, 21 devoid of driving devices and defined for convenience as driven shuttles. A driving shuttle 12, 22 is connectable to one or more driven shuttles 11, 21 to form a convoy of shuttles that is movable along the path P.

A convoy can also be formed by only one driving shuttle or by only one driven shuttle.

The driven shuttles 1, 21 are provided with brakes for stopping and immobilizing the shuttles in defined operating positions along the path P.

The brakes can also be provided for the driving shuttles 12, 22.

Each shuttle 11, 12 further comprises hooking devices for connecting adjacent shuttles to form a convoy of shuttles.

In one embodiment, the hooking device is a fixed device 35 including, for example, screwable plates or brackets. Alternatively, the shuttles 21, 22 can include further movable hooking devices 36 that are selectively activated for engaging with or disengaging from a respective further hooking device 36 of an adjacent shuttle 21, 22 in order to connect or disconnect the shuttles tp form or dismantle a convoy of shuttles, respectively.

In the embodiment illustrated in FIGS. 1 to 7, the shuttles include a plurality of shuttles 11, 12, 21, 22 that are differently connected together in such a manner as to form two distinct convoys 5, 6 of shuttles.

In particular, the plurality of shuttles include a first driving shuttle 12 (i.e. shuttle provided with a driving device) and a first driven shuttle 11 (i.e. devoid of driving device) that are connected together by a hook 35 to form a first convoy 5, the first shuttles 11, 12 being arranged for receiving and moving an unwinding unit 50 of the film. The first driven shuttle 11 is empty for dismantling and receiving from the wrapping machine an unwinding unit 50 to be replaced, whereas the first driving shuttle 12 supports a replacement unwinding unit 50 to be mounted on the wrapping machine 100.

As will be explained better below, the first convoy 5 is movable along the path P between a first operating position F1 (FIG. 8) in which the first driven shuttle 11, by a first transfer device 15 of the shuttle, dismantles and receives from the wrapping machine 100 an unwinding unit 50 to be replaced, a second operating position F2 (FIG. 9), in which the first driving shuttle 12, by a respective first transfer device 15, transfers and mounts a new unwinding unit 50 on the wrapping machine 100 and a first inactive position N1 (FIG. 10) in which both the first shuttles 11, 12 are outside the working zone W of the wrapping machine 100 in order not to interfere with the operation of the latter.

In one version of the movement system of the invention, the first convoy 5 can include only one shuttle, for example the first driving shuttle, provided with an empty transfer device for dismantling and receiving from the wrapping machine 100 an unwinding unit 50 to be replaced and a further transfer device supporting a replacement unwinding unit 50 to be mounted on the wrapping machine 100.

The plurality of shuttles further includes a second driven shuttle 21 (i.e. devoid of a driving device) and a second driving shuttle 22 (i.e. provided with a driving device) that form a second convoy 6. The second driving shuttle 22 supports a first operating unit 30 for gripping, cutting and welding the film, while the second driven shuttle 21 supports a second operating unit 40 for retaining the film 4.

As will be explained below, the second driving shuttle 22 is moved in a coordinated manner with the conveyor 103 at the same translation speed to enable the first operating unit 30 to perform operations for gripping, cutting and welding the film on the load 70 while the latter, wrapped with the film 4, is moved along the advancing direction V to exit the wrapping machine 100.

With particular reference to FIG. 3, the guide 2 includes a closed section beam 53 to which the shuttles 11, 12, 21, 22 are connected and along which the shuttles 11, 12, 21, 22 can slide. The closed section beam 53 bestows the appropriate torsional stiffness on the guide 2, so as to ensure high precision in positioning of the shuttles and thus of the operating units supported by the shuttles.

The guide 2 is substantially rectilinear and arranged parallel to the advancing direction V, adjacent to the conveyor 103. In particular, the guide 2 traverses the working zone W of the wrapping machine 100 longitudinally.

Alternatively, the guide 2 can be curved and include one or more rectilinear portions, for example, at the working zone W.

The guide 2 is modular and includes a plurality of beam sections or modules 53a that are connected together. The single modules 53a can be rectilinear or curvilinear and have different lengths.

In this manner it is possible to easily, cheaply and quickly make beams 53 of different length and shape according to the features of the wrapping machine and of the number and type of the operating units.

In one version of the system that is not illustrated, the guide 2 can include a pair of beams 53 arranged parallel and adjacent to opposite sides of the movement system 1 of the wrapping machine 100.

Each shuttle includes a carriage that is movable along the path P on the guide 2. The carriage is provided with wheels or sliding rollers and is configured for engaging and sliding on the guide 2. In particular, the wheels engage and slide inside rails of the beam 53.

The carriage includes a hook for connecting to a corresponding hook of an adjacent shuttle. The carriage further slidably supports respective transfer devices arranged for supporting and moving a respective operating unit and including, in particular, a first transfer platform fixed by telescopic guides to end portions of the carriage in such a manner as to be movable between a retracted position D1 and an extended position D2 along the operating direction T. In the extended position D2 of the transfer device, the operating unit that is supported by the latter is positioned to interact with and/or perform operations on the load and/or on the film and/or on the wrapping machine. In the retracted position D1 of the transfer device the operating unit is positioned to not interfere with the load and/or the film and/or the wrapping machine.

The transfer device is moved by an acturator.

The driving device associated with a shuttle includes, for example, an electric motor fixed to the carriage that rotates a gearwheel engaged with a rack fixed to the guide 2. Alternatively, the electric motor of the driving device can drive a pulley or a gearwheel that is able to couple with belt or chain fixed transmission systems of the guide 2 to move the shuttle.

Also alternatively, the driving device can include a coupling device for coupling with belt or chain transmission systems moved along the path P by a motor, for example an electric motor, associated with the guide 2. The driving device can be activated or deactivated to connect or disconnect the shuttle to/from the transmission systems to enable the shuttle to move or stop.

With particular reference to FIG. 4, the first driven shuttle 11 includes a first carriage 13 provided with wheels or sliding rollers 14 and configured for engaging and sliding on the guide 2. In particular, the wheels 14 engage and slide inside a pair of rails 33 fixed to opposite sides of the beam 53.

The first carriage 13 includes a hook 35 for connecting to corresponding hook 35 of an adjacent first driven shuttle 11 or first driving shuttle 12.

The first transfer device 15 of the shuttles is slidingly connected to the first carriage 13 and is intended for housing and supporting an operating unit such as an unwinding unit 50. The first transfer device includes a first transfer platform 15 fixed by telescopic guides 18 to end portions of the first carriage 13, in such a manner as to be movable between a retracted position D1 and an extended position D2 along the operating direction T.

First actuator 16 is provided for moving the first transfer platform 15 along the operating direction T. The first actuator 16 includes, for example, a pneumatic or electric linear actuator.

The first transfer platform 5 is provided with a stop 17 arranged for engaging with the unwinding unit 50 when the latter is positioned on the first transferring platform 15 and for preventing undesired movements thereof on a horizontal plane that is parallel to the platform. The stopping means includes, for example, a plurality of pins 17 that are suitable for engaging respective holes provided on a lower portion of the unwinding unit 50.

The first transferring means 15, as it is movable between the retracted position D1 and the extended position D2 along the operating direction T, enables the first driven shuttle 11 to selectively dismantle and receive an unwinding unit 50 to be replaced or to transfer and mount a replacement unwinding unit 50.

The first driving shuttle 12 is substantially identical to the first driven shuttle 11 from which it differs by including a first driving device 19 that enables movement thereof along the guide 2. The first driving device 19 includes, for example, an electric motor fixed to the first carriage 13 that rotates a gearwheel engaged with a rack fixed to the guide 2.

Alternatively, the electric motor of the first driving device 19 can drive a pulley or gearwheel that is able to couple with belt or chain fixed transmission systems of the guide 2 so as to move the first driving shuttle 12.

Still alternatively, the first driving device of the first driving shuttle 12 can include a coupling device for coupling with belt or chain transmission systems moved along the path P by a motor, for example an electric motor, associated with the guide 2. The driving device can be activated or deactivated for connecting or disconnecting the first driving shuttle 12 to/from the transmission systems and enabling the movement or stopping thereof. The driving device can be activated or deactivated to connect or disconnect the shuttle to/from the transmission systems to enable the shuttle to move or stop.

Figure 5:
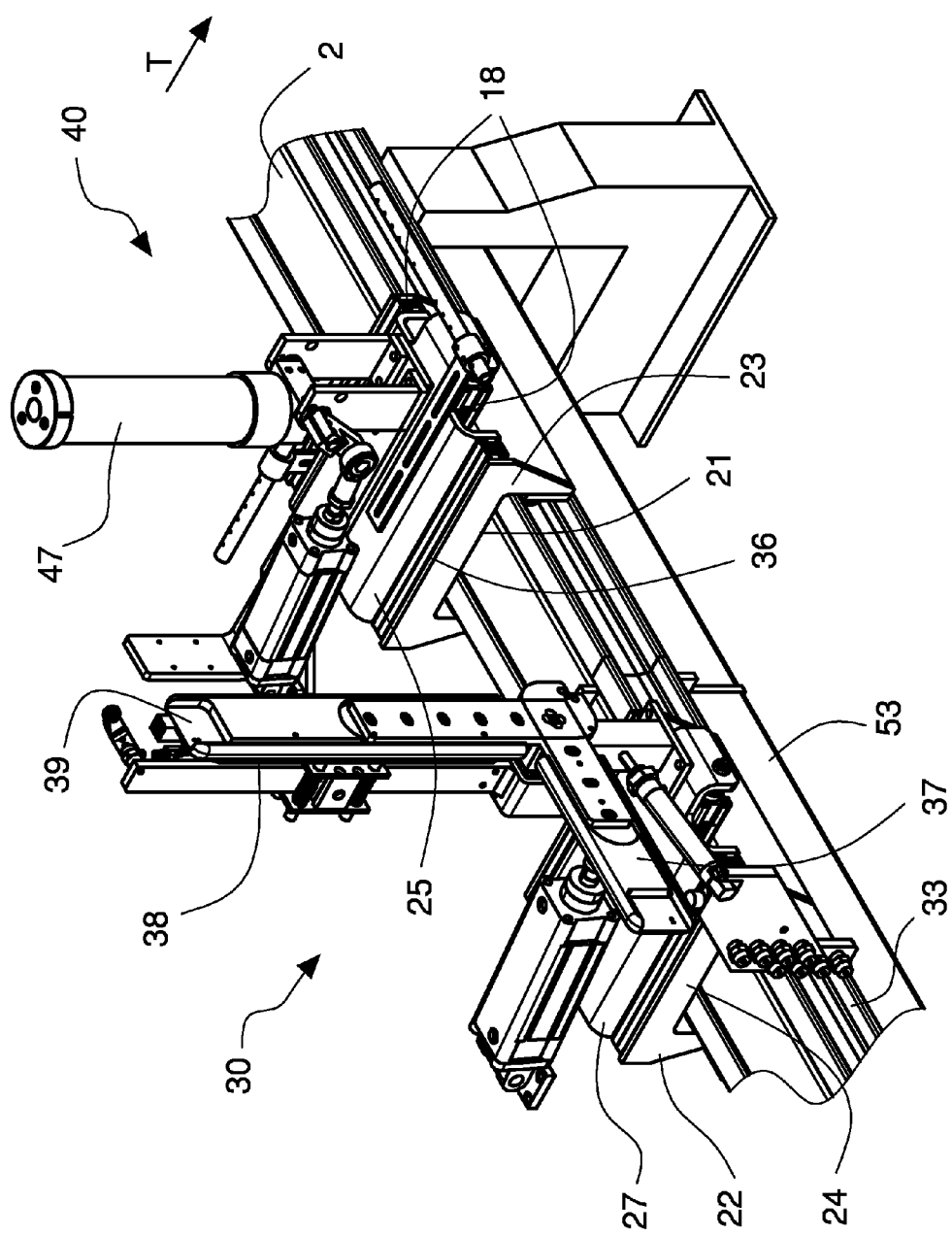
FIG. 5 is an enlarged detailed view of the movement system in FIG. 3 that illustrates a shuttle assembly supporting a first operating unit and a second operating unit of the wrapping machine.
Figure 6:
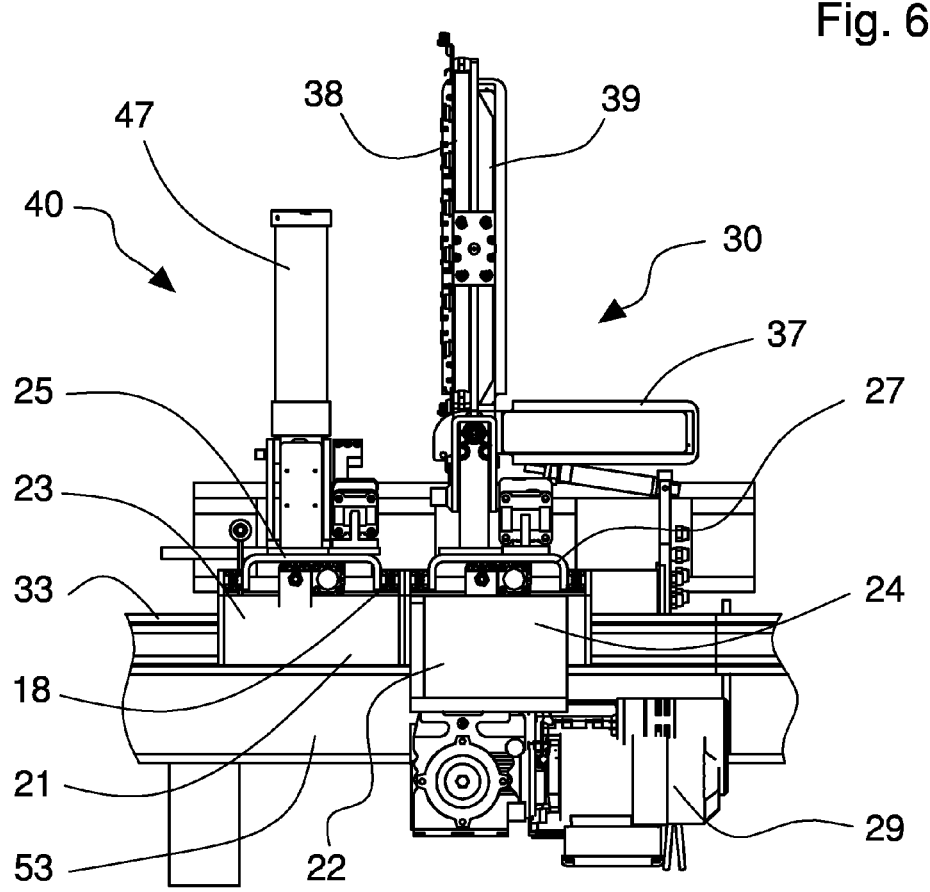
FIG. 6 is an enlarged detail in FIG. 2 that illustrates a shuttle assembly supporting the first operating unit and the second operating unit.
Figure 7:
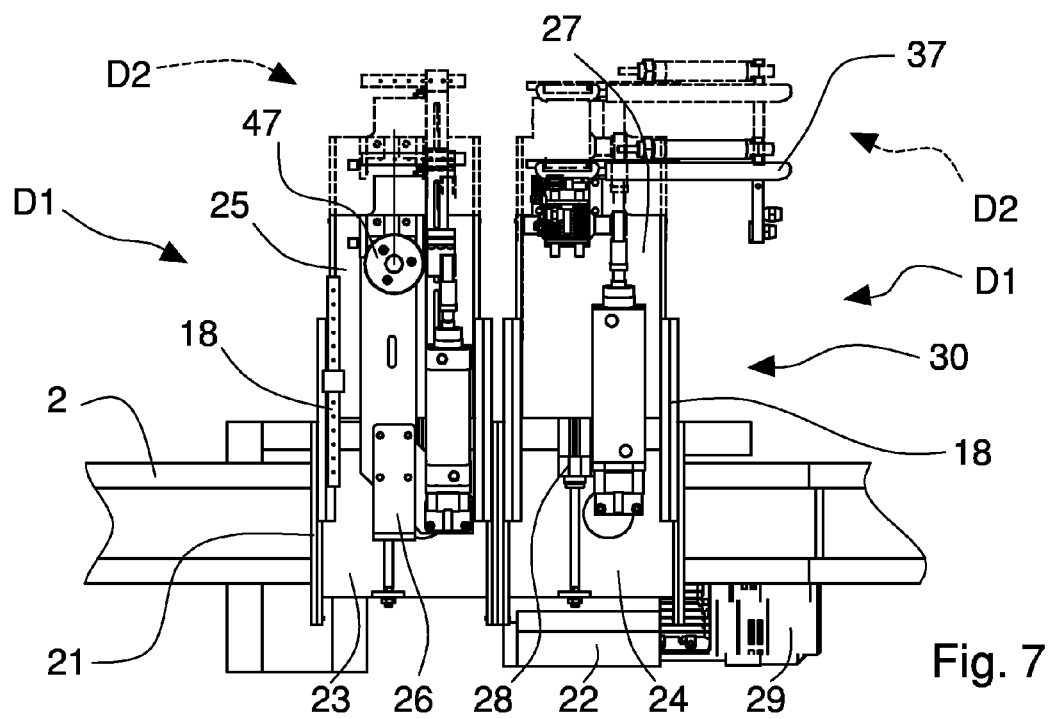
FIG. 7 is a plan view of the shuttle assembly and of the operating units in FIG. 6, the shuttle assembly being illustrated in two different operating configurations.

With particular reference to FIGS. 5 to 7, the second driven shuttle 21 (i.e. devoid of a driving device) is substantially similar to the first driven shuttle 11, from which it differs by the fact of including a second carriage 23 and second transfer device 25 configured for housing and supporting a second operating unit 40 for retaining the film. Also in this case, the second carriage 23 is provided with wheels or sliding rollers for engaging and sliding inside the rails 33 of the guide 2.

The second carriage 23 includes further hooks 36 for reversibly connecting to corresponding further hooks 36 of an adjacent second driven shuttle 21 or second driving shuttle 22.

The second transfer device 25 is slidably connected to the second carriage 23 by respective telescopic guides 18 and driven along the operating direction by a second actuator 26 between a retracted position D1 and a n extended position D2. The second actuator 26 includes, for example, a pneumatic or electric linear actuator.

In the respective extended position D2 the second operating unit 40 can interact with the load 70.

The second operating unit 40 for retaining the film of known type includes a spring clip pliers 47 that is suitable for grasping and retaining an end flap of the film connected to the reel when the film is cut at the end of the wrapping process.

The second driving shuttle 22 (i.e. provided with driving device) includes a further second carriage 24 provided with further second transfer device 27 configured for housing and supporting a first operating unit 30 for gripping, cutting and welding the film. The further second transfer device 27 is slidably connected to the further second carriage 24 by telescopic guides 18 and is driven along the operating direction T by a further second actuator 28 between a retracted position D1 and an extended position D2. In the extended position D2 the first operating unit 30 can interact with the load 70.

The further second carriage 24 is provided with a second driving device 29 that enables the further second carriage 24 to be moved along the guide 2. The second driving device 29 includes an electric motor that rotates a gearwheel engaged with a rack fixed to the guide 2. Alternatively, the electric motor of the second driving device 29 can drive a pulley or gearwheel that is able to couple with belt or chain fixed transmission systems of the guide 2 so as to move the second driving shuttle 22.

Still alternatively, the second driving device of the second driving shuttle 22 can include coupling devices for coupling with belt or chain transmission systems moved along the path P by a motor, for example an electric motor, associated with the guide 2. The driving device can be activated or deactivated for connecting or disconnecting the second driving shuttle 22 to/from the transmission systems and enabling the movement or stopping thereof.

The first operating unit 30, of known type, includes a contrasting lever 37, a cutting element 38 and a welding gun 39 that is able to grasp, cut and weld the film at the end of the wrapping process.

Alternatively, the first operating unit 30 can include only the contrasting lever 37 and the welding gun 39, the cutting element 38 being mounted in this case on the second operating unit 40.

As already shown, the shuttles 11, 12, 21, 22 are movable along the path P between one or more operating positions in which the operating units supported thereby can interact and perform operations on the load 70 and/or on the film and/or on the wrapping machine 100 and one or more inactive positions in which the shuttles 11, 12 and the corresponding operating units are outside a working zone W of the wrapping machine 100 in order not to interfere with the operation of the latter.

A process for automatically replacing the unwinding unit 50 mounted on the wrapping machine 100 using the movement system 1 of the invention is described below.

Figure 8:
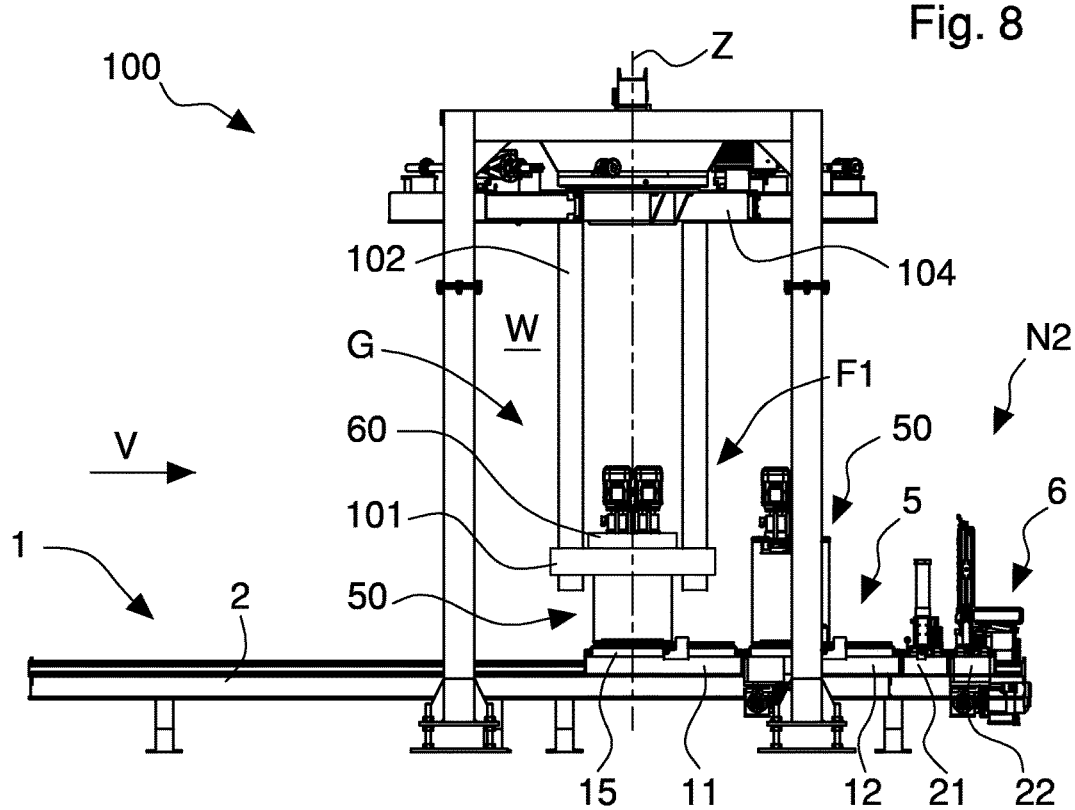
FIGS. 8 and 9 are front views of the system and of the wrapping machine in FIG. 1, respectively, in a first and a second operating configuration of a process of replacement of an unwinding unit mounted on the machine.
Figure 9:
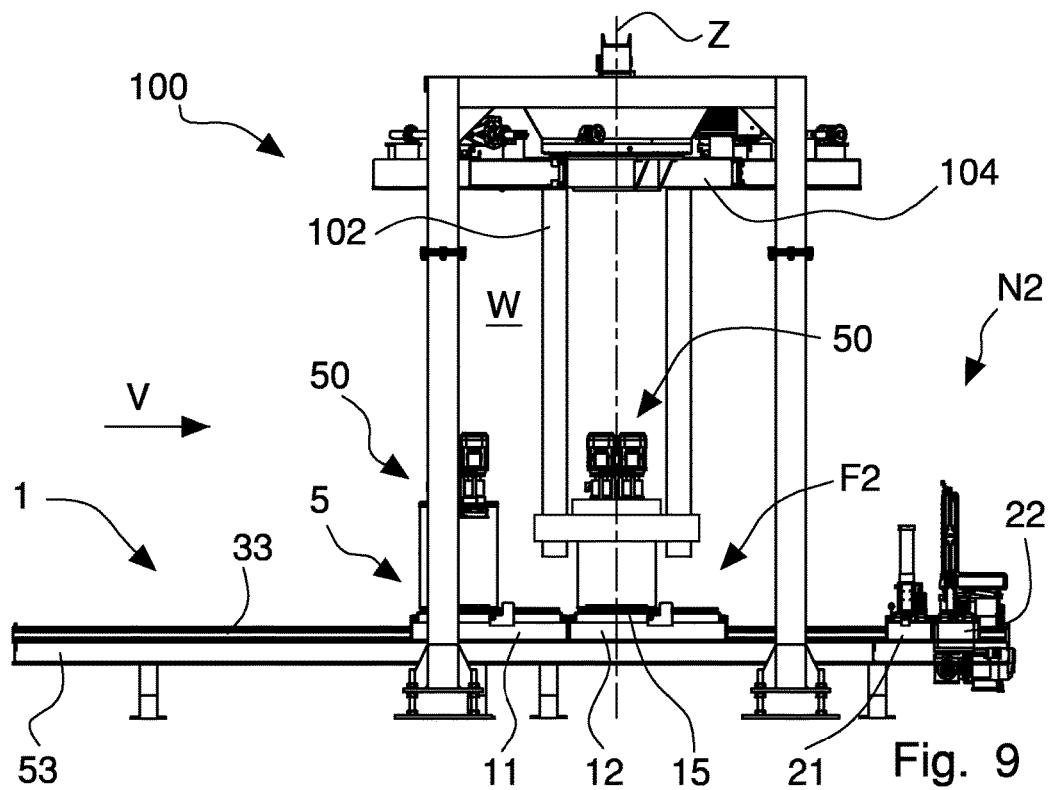

With reference to FIGS. 8 and 9, in a first step of the replacement process, the shuttles 11, 12, 21, 22 are moved in such a manner that the first convoy 5 of the first shuttles 11, 12 is arranged in a first operating position F1 and the second convoy 6 of the second shuttles 21, 22 is arranged in a second inactive position N2 so that the first operating unit 30 and the second operating unit 40 do not hinder the process.

In the second inactive position N2 the first operating unit 30 and the second operating unit 40 are outside the working zone W and do not interfere with the operation of the wrapping machine.

In the first operating position F1 the first convoy 5 is inside the working zone W and the empty first driven shuttle 11 is able to dismantle and receive the unwinding unit 50 to be replaced. In particular, the first transfer device 15 of the first driven shuttle 11 is arranged in the extended position D2 to receive the unwinding unit 50 to be replaced. For this purpose, the wrapping machine 100 is arranged in a replacement configuration G in which the rotating arm 102 is aligned with the first driven shuttle 11 and the carriage 101, to which the supporting unit 60 is fixed, is progressively lowered vertically in such a manner as to rest the unwinding unit 50 to be replaced on the transfer device 15 (FIG. 8) of the first driven shuttle 11. The stop 17 engages the unwinding unit 50 to be replaced in such a manner that the transfer device 15, by moving along the operating direction T from the extended position D2 to the retracted position D1, disengages and dismantles the unwinding unit 50 to be replaced from the supporting unit 60 fixed to the carriage 101.

As in the retracted position D1 of the first driven shuttle 11, the unwinding unit 50 to be replaced is detached and spaced from the supporting unit 60, i.e. from the carriage 101. The first convoy 5 can be moved to the second operating position F2 in which the first driving shuttle 12 provided with the replacement unwinding unit 50 is at the supporting unit 60 (FIG. 9). At this point, the transfer device 15 of the first driving shuttle 12 is moved from the retracted position D1 to the extended position D2 to mount the replacement unwinding unit 50 or the supporting unit 60.

Figure 10:
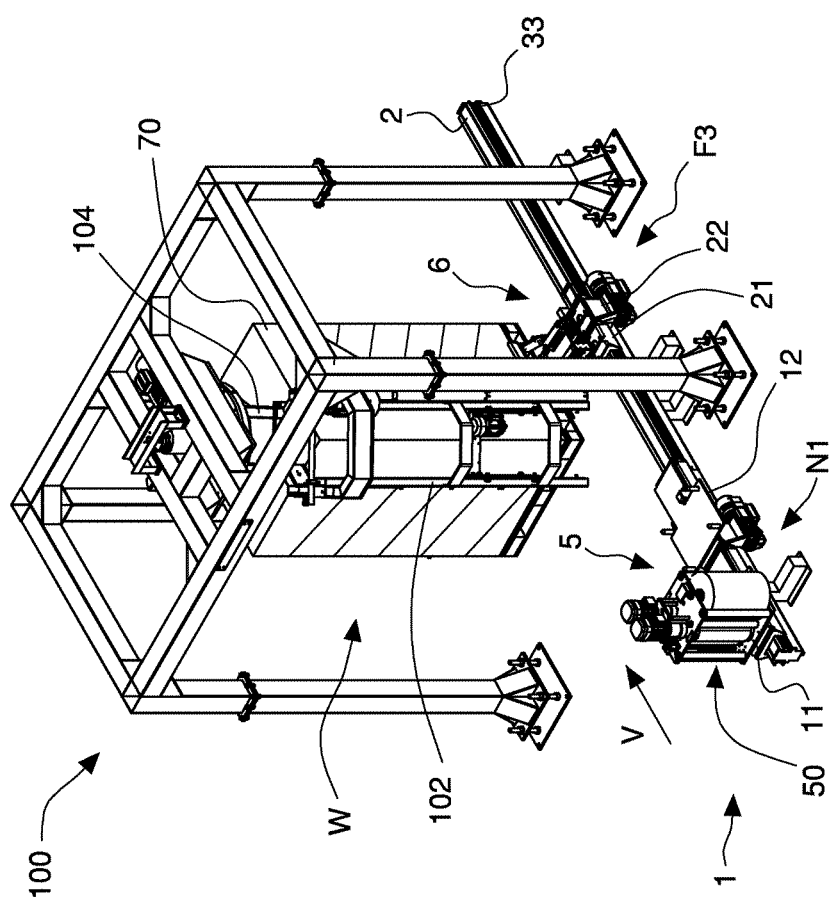
FIG. 10 is a perspective view of the system and of the wrapping machine in FIG. 1 in a first step of an operating process of gripping, cutting and welding the film at the end of wrapping.

The carriage 101 is subsequently moved vertically along the vertical arm 102 in such a manner as to disengage the unwinding unit 50 that has just been mounted from the stop 17 of the first driving shuttle 12. The first convoy 5 of the shuttle can then be moved along the path P, from the second operating position F2 to the first inactive position N1, outside the working zone W to enable the wrapping machine to wrap the load (FIG. 10).

During wrapping of the load, the second shuttles 21, 22 of the second convoy 6 can be moved from the second inactive position N2, to a third operating position F3 in which the first operating unit 30 and the second operating unit 40 can interact with the load 70 and perform, stationary in the third operating position F3, operations for gripping, cutting and welding the film.

Owing to the movement system 1 of the invention it is thus possible to move the operating units to the respective operating positions adjacent to the load 70 and/or inside the working zone W only when they have to operate, maintaining on the other hand the operating units in positions when they are not active. This enables the space occupied by the wrapping machine to be limited, accessibility thereto to be improved and permits mounting and correct operation of the different operating units.

FIGS. 10 to 15 illustrate the method according to the invention for performing operations on a load 70, in particular wrapped with the film 4, by two operating units 30, 40 moved by the shuttles 21, 22 in a coordinated manner with the load 70 wrapped with the film along the advancing direction V of the load and outside the wrapping machine.

In particular, a method is disclosed below for carrying out the process for gripping, cutting and welding the film, at the end of wrapping the load 70, while the latter is moved outside the wrapping machine by the conveyor 103.

In a first step of the process, the first shuttles 11, 12 of the first convoy 5 are arranged and stopped in the first inactive position N1 in order not to interfere with the operation of the machine and in particular with the process for gripping, cutting and welding the film.

The second shuttles 21, 22 of the second convoy 6 are arranged in the third operating position F3, the respective second transferring means 25, 27 in the corresponding extended positions D2, to enable the operating units 30, 40 to perform the necessary operations on the film 4 (FIG. 10).

When wrapping has almost been completed, the contrasting lever 37 of the first operating unit 30 is rotated to a vertical position so as to be wrapped with least one coil or band of film 4 dispensed by the unwinding unit 50.

Figure 11:
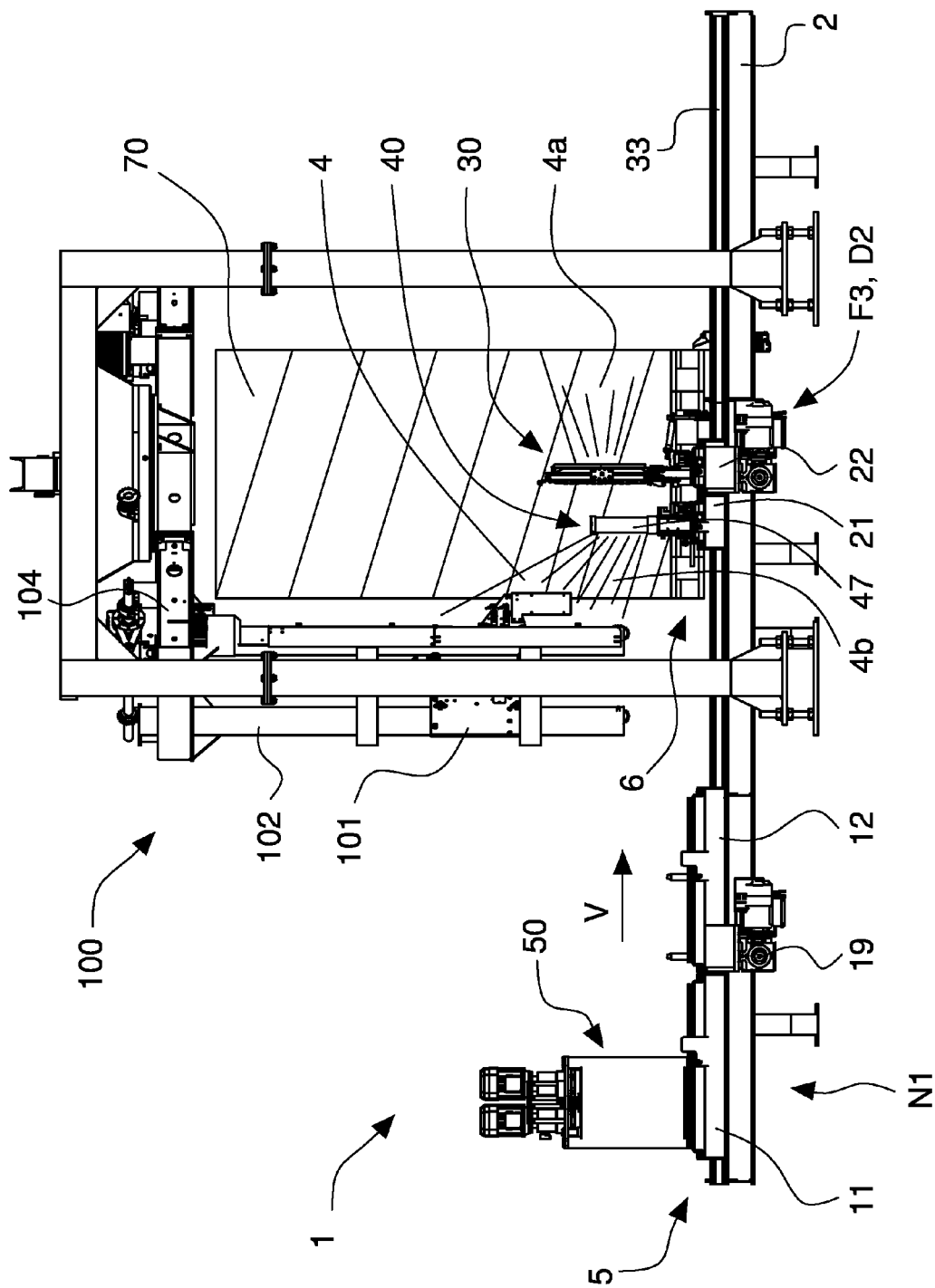
FIGS. 11 and 12 are, respectively, front and top plan views of the system and of the wrapping machine in FIG. 1 in a second step of the operating process of gripping, cutting and welding the film.
Figure 12:
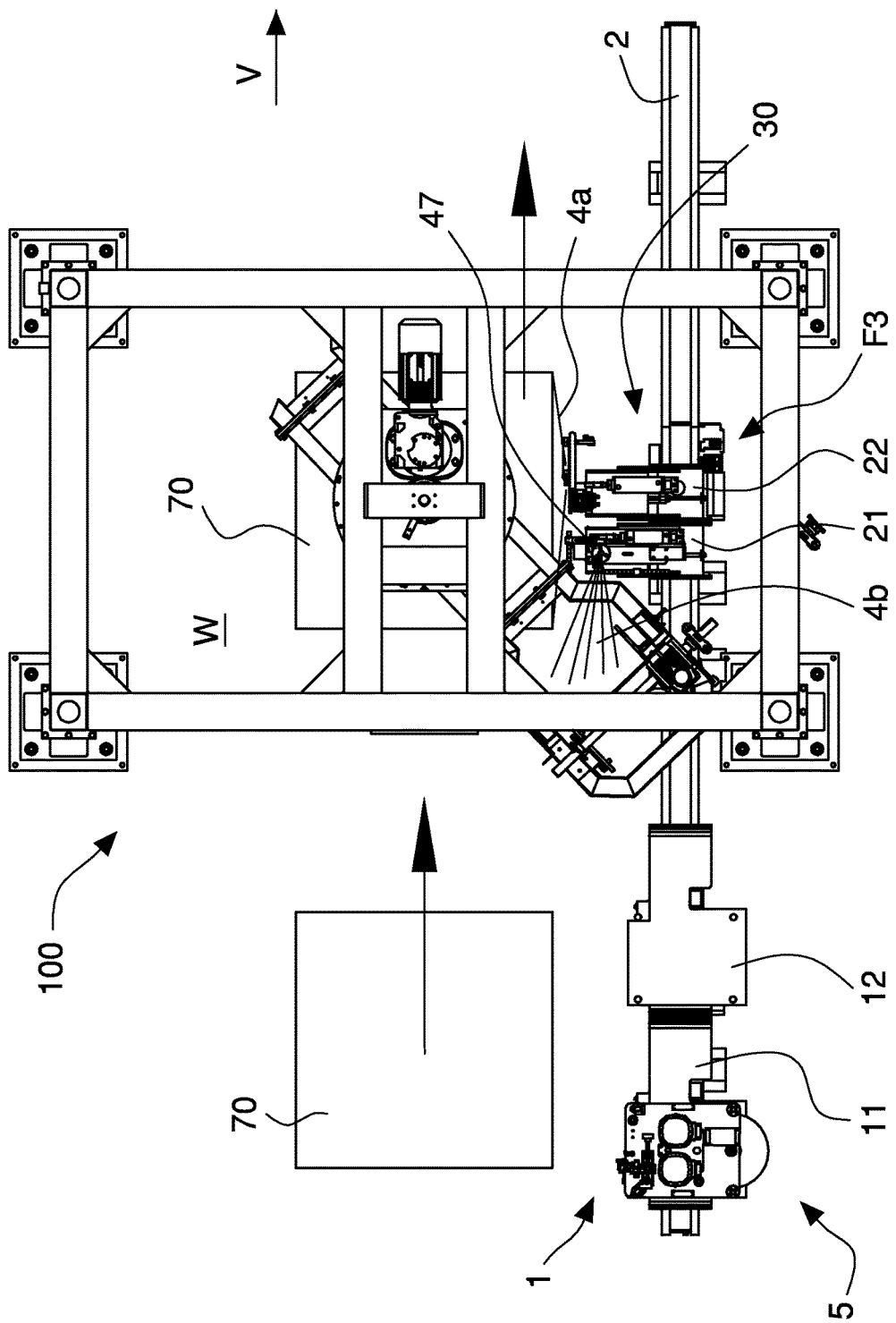

In a second step of the process, with the load 70 correctly wrapped and the rotation of the vertical arm 102 stopped, the spring clip pliers 47 of the second operating unit 40 is driven to grasp and retain the film 4. At this point, the cutting element 38 of the first operating unit 30 cuts the film 4 and retains a first flap 4a of the film thereby obtained (tail of the film), the second flap 4b of the film being retained by the spring clip pliers 47 (FIGS. 11 and 12).

In a third step, immediately after execution of the cut, the conveying means 103 and the second driving shuttle 12 are driven in such a manner as to move the load 70 and the first operating unit 30 in the advancing direction V at a substantially equal and constant speed.

Figure 13:
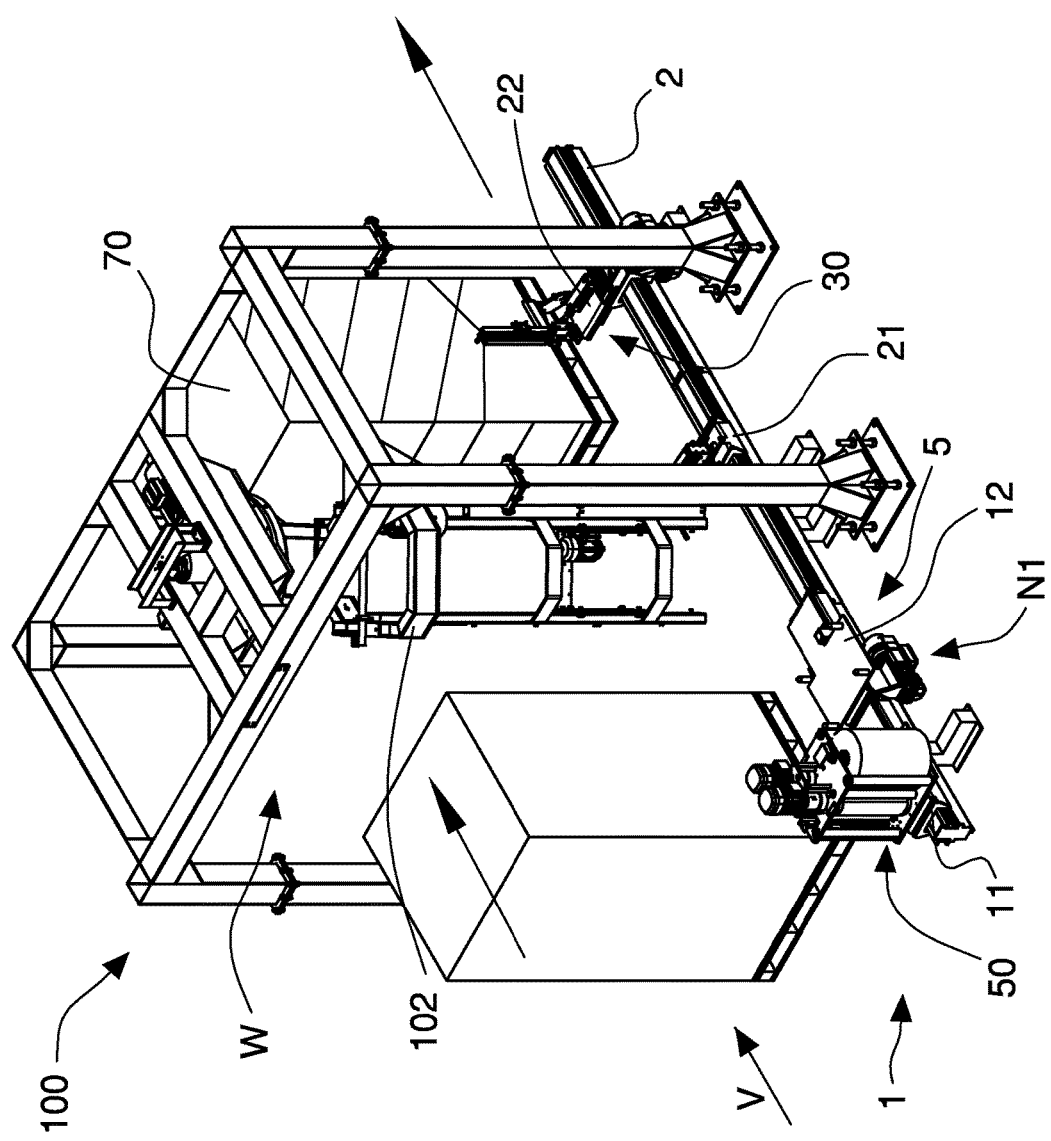
FIGS. 13 and 14 are, respectively, perspective and top plan views of the system and of the wrapping machine in FIG. 1 in a third step of the operating process of gripping, cutting and welding the film.
Figure 14:
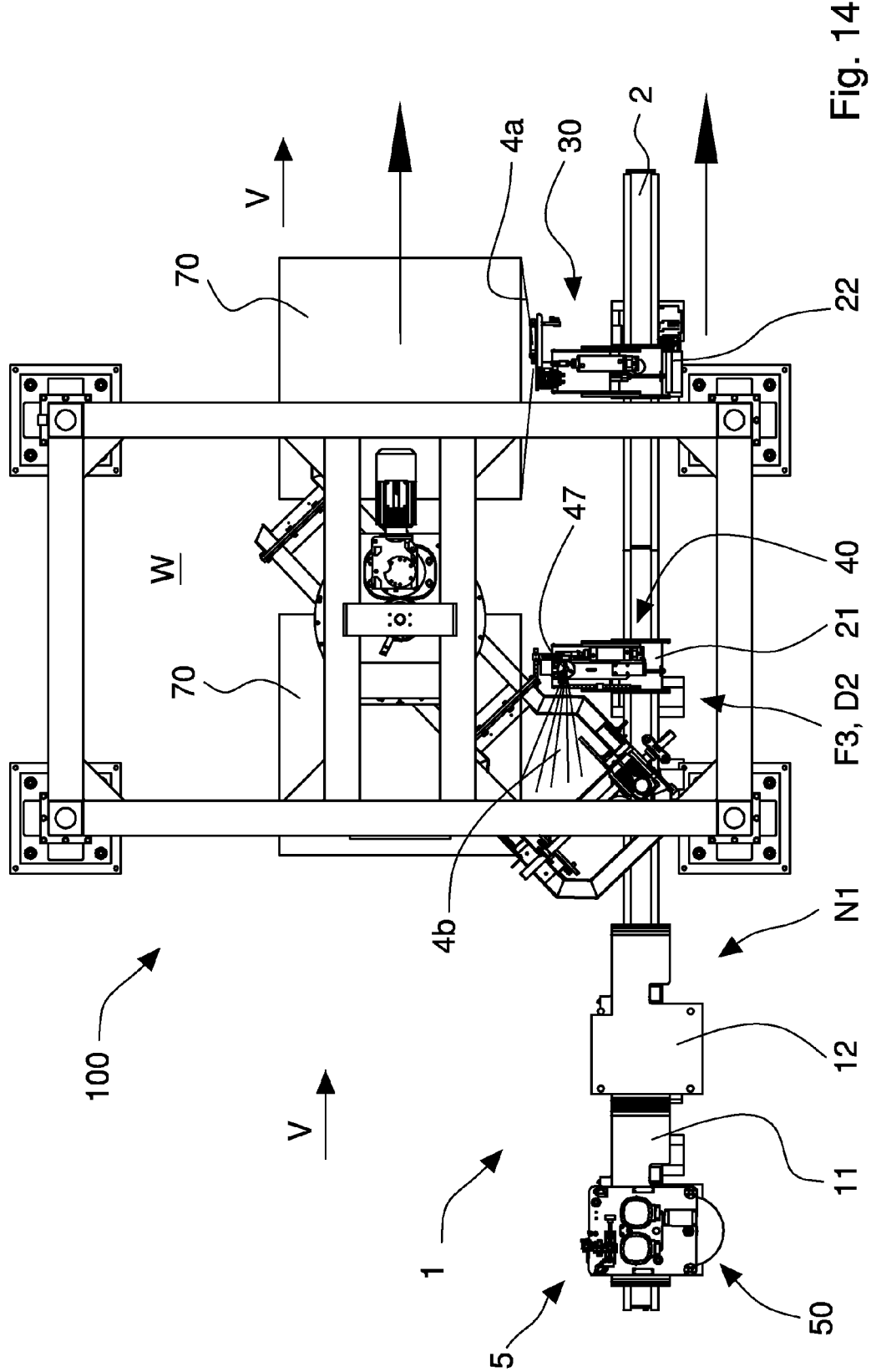
Figure 15:
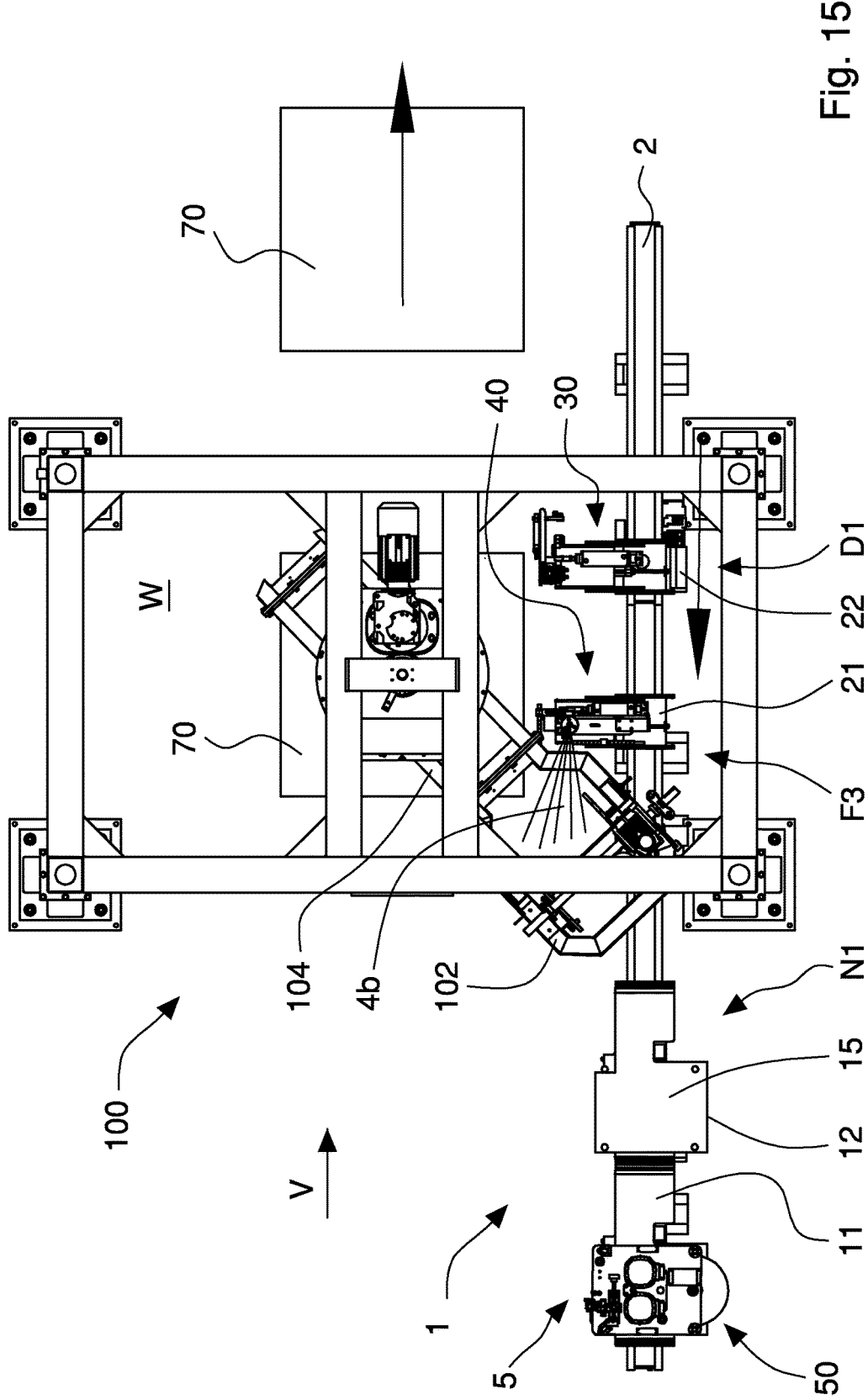
FIG. 15 is a plan view of the system and of the wrapping machine in FIG. 1 in a fourth step of the operating process of gripping, cutting and welding the film.

As the spring clip pliers 47 has to retain the second flap 4b of film without further unwinding the film from the reel 3 of the unwinding unit 50, the second operating unit 40 and the second driven shuttle 21 that supports second operating unit 40 remain stationary in the third operating position F3. The second driven shuttle 21, blocked by the respective brake, is thus separated from the second driving shuttle 22 which proceeds along the guide 2 in the advancing direction V. During exiting of the load 70, the welding gun 39 welds, in cooperation with the contrasting lever 37, the first flap 4a to the film already wrapped on the load 70 (FIGS. 13 and 14).

Welding time varies according to the features of the synthetic plastic material of the film and/or the dimensions of the first flap 4a.

While the load 70 wrapped with the film 4 is moved outside by the conveyor 103, a new load 70 to be wrapped is introduced into the wrapping machine, progressively inside the working zone W.

In a fourth step, after welding has been completed, the contrasting lever 37 is disengaged from the film 4 wrapped on the load 70 and while the latter continues towards the exit of the machine 100 along the advancing direction V, the second driving shuttle 22 and the first operating unit 30 are moved in the direction opposite to the advancing direction (FIG. 15) as far as the third operating position F3 to be hooked again to the second driven shuttle 21. In the return stroke, the transfer device 15 of the second driving shuttle 22 is returned to the retracted position D1.

It should be noted that during the welding time necessary to perform welding of the first flap 4a of film, the new load 70 to be wrapped can be positioned on the conveyor ready to be wrapped.

Alternatively, and as a function of the duration of welding time, the wrapping cycle of the new load can start as soon as the wrapped load 70 has freed the working zone W.

In a further alternative, during welding, the unwinding unit 50 replacement process can be run to replace the unwinding unit 50 mounted on the wrapping machine with a replacement unwinding unit 50 supported and moved by the first convoy 5 of the shuttle.

In this manner, it is possible to run a welding process in so-called "masked" time, i.e. while the load 70 wrapped with the film 4 is moving and the wrapping machine performs other functions (receiving a new load 70, replacing the unwinding unit 50, etc.).

For the purposes of productivity, film welding time can thus be recovered during which in traditional machines the machine is stationary and inactive.

Figure 16:
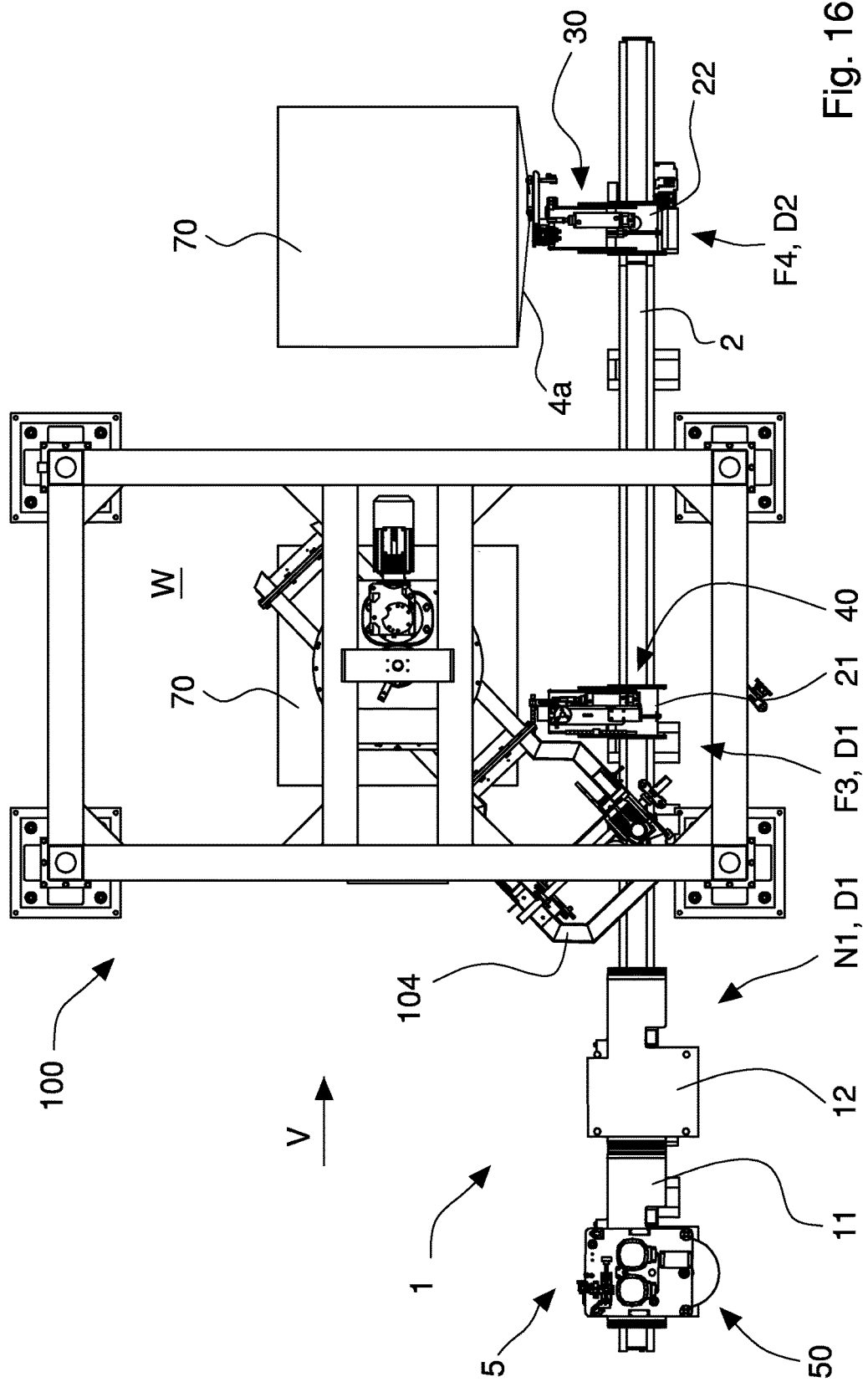
FIG. 16 is a plan view of the system and of the wrapping machine in FIG. 1 in one version of the operating process of gripping, cutting and welding the film.

Film welding can also be performed with the wrapped load 70 stationary, after the latter has left the working zone W. In this case, as illustrated in FIG. 16, the second driving shuttle 22 is moved to a fourth operating position F4 in which the first operating unit 30 can perform welding of the first flap 4a of film.

Also in this case, while the load 70 wrapped with the film 4 is moved to the exit and the film is welded, a new load 70 to be wrapped can be introduced into the machine in the working zone W.

It is thus possible to run a welding process in so-called "semi-masked" time, i.e. while the wrapped load 70 is stationary and the wrapping machine performs other functions (receiving new load 70 to be wrapped, replacing the unwinding unit 50, etc.).

Also in this case it is possible to increase the productivity of the wrapping machine by actively using film welding time that in traditional machines is a time during which the machine is stationary and inactive.

Figure 17:
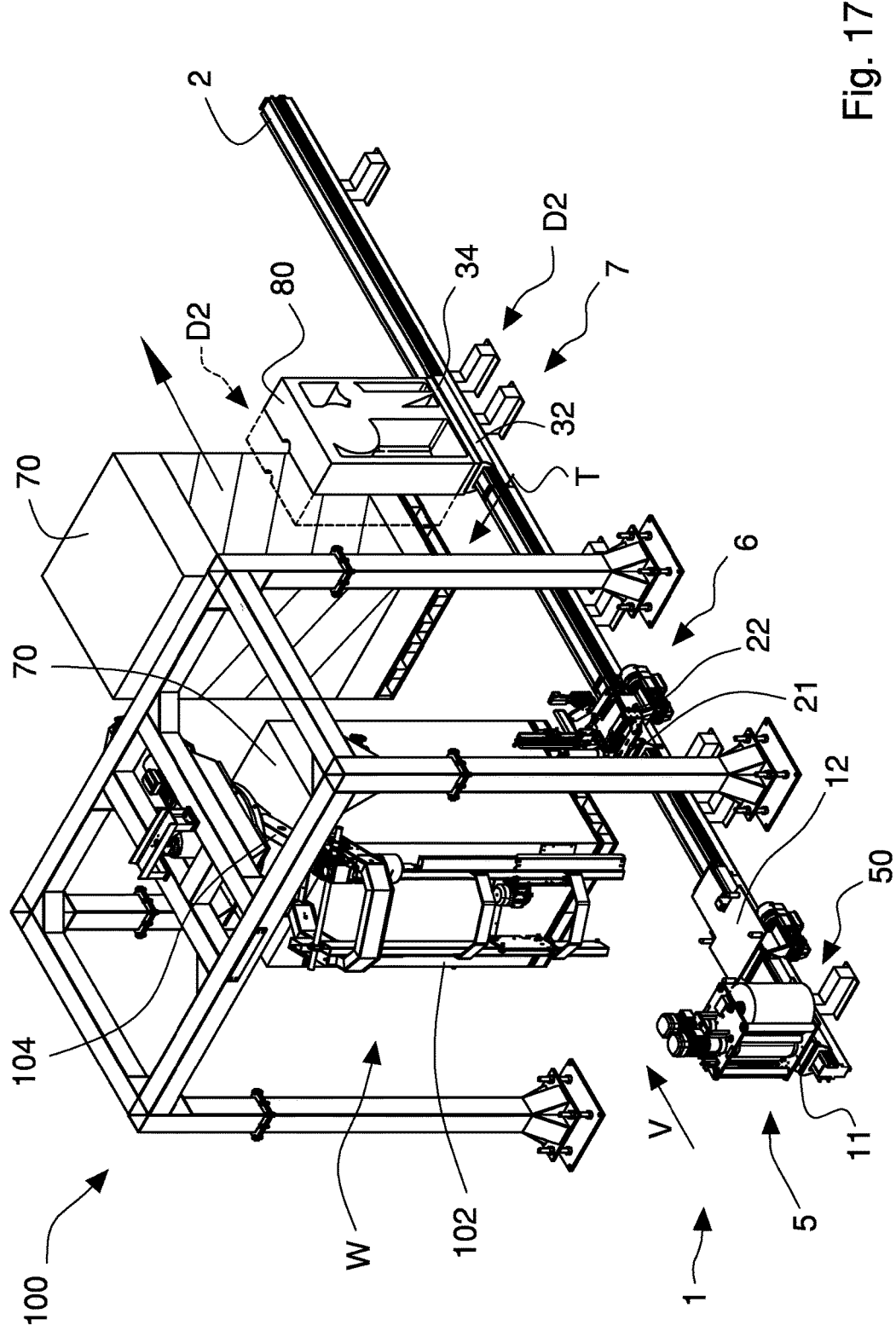
FIG. 17 is a perspective view of a version of the movement system in FIG. 1 in a labelling process.

FIGS. 17 and 18 illustrate one version of the movement system of the invention that differs from the previously disclosed embodiment by the shuttles that include in addition to the first shuttles 11, 12 and to the second shuttles 21, 22 connected together to form respectively the first convoy 5 and the second convoy 6, a third shuttle 32 provided with a driving device (defined for convenience as the third driving shuttle) and arranged for supporting a fourth operating unit 80. The third driving shuttle forms a third convoy 7 for supporting and moving the fourth operating unit 80 that is, for example, a labelling unit arranged for placing labels or identifying adhesives on the load 70 wrapped with the film.

The third driving shuttle 32 is substantially similar to the second driving shuttle 22 and includes a third transfer device 34 which is movable along the operating direction T between a respective retracted position D1 and a respective extended position D2 to enable the fourth labelling operating unit 80 to interact with the load or be spaced apart therefrom, respectively.

The operating procedure of the fourth labelling operating unit 80 is substantially identical to what was described for the second gripping, cutting and welding operating unit 40.

The procedure for applying the label to the wrapped load 70 can occur in "masked" time, i.e. by moving the third driving shuttle 32 and the fourth labelling operating unit 80 and the wrapped load 70 in a coordinated manner along the advancing direction V as illustrated in FIG. 17.

Alternatively, the procedure for applying the label to the wrapped load 70 can occur in "semi-masked" time, i.e. with the wrapped load 70 stationary and outside the working zone W. In this case, the third driving shuttle 32 is arranged in a fifth operating position F5 in which the fourth operating unit 80 can apply a label to the wrapped load 70 (FIG. 18).

In both cases, while the label applying process is running, the wrapping machine 100 can perform other functions, in particular it can receive a new load 70 or replace the unwinding unit 50.

FIG. 19 illustrates one version of the fourth labelling operating unit 80 that is installable on the shuttle and is provided with an articulated arm 61 that is movable along the operating direction T. In this case, the third driving shuttle 32 is devoid of a transfer device that is movable along the operating direction T.

The movement system 1 of the invention can move other types of operating units that can operate in movement, i.e. can perform respective operations on the film and/or on the load while the latter is moved into or out of the wrapping machine, or can perform operations on the load and/or on the film and/or on the machine in established operating positions, inside or outside the working zone W of the wrapping machine W.

In addition to the operating units described above, it is possible to provide a fifth operating unit for printing directly on the film wrapped on the load, one or more sixth operating units for applying angular guards and the like to the load.

One advantage of the movement system 1 and of the wrapping machine 100 is of being able to move the operating units into the respective operating positions, adjacent to the load and/or to the inside of the working zone W, only when they have to operate, and vice versa maintaining the operating units, when inactive, in inactive positions, outside the working zone so as not to obstruct the operation of the machine. The guide 2 of the movement system 1 traverses the working zone W of the wrapping machine 100 parallel to an advancing direction V of the load and adjacent to the conveying means of the machine.

This not only enables the space occupied by the wrapping machine to be limited, so as to make the arrangement and the positioning of the latter more flexible and easier in the environment or room of installation but also enables the accessibility of the wrapping machine to be improved for routine maintenance (for example retooling of the operating units) or proactive maintenance.

Owing to the movement system 1, the mounting and correct operation of operating units is further possible which in traditional wrapping machines could not be mounted together or could be mounted only with significant structural modifications of the machine and/or in non-optimum operating positions.

Another advantage of the movement system 1 and of the wrapping machine 100 lies in the fact that the simultaneous movement of the operating units and of the load or the possibility of moving the operating units to different operating positions (inside and outside the working zone W) enable different operations or functions to be performed simultaneously so as to significantly increase the productivity of the machine with respect to known wrapping machines. In particular, it is possible to perform operations (film welding, labelling, printing) to an exiting load wrapped with the film (with the load moving or stationary outside the working zone) while a new load is introduced into the machine, and possible wrapped, or while further operations (for example replacing the unwinding unit) are performed on the machine.

It should be noted that if the operations have been performed by moving the operating units and the load along the advancing direction V with a coordinated motion, at the same speed, there is no load transfer time in which the wrapping machine is inactive and does not perform operations, thus the performance of operations and/or functions is optimized and the productivity of the wrapping machine is increased still further. Finally, the movement system 1 for moving the operating units constitutes an integrated system that enables the wrapping machine to perform wrapping operations (gripping, cutting and welding the film) and optional operations (replacing the unwinding unit, labelling, printing, inserting guards) in a completely automated manner without requiring the intervention of operators.

Figure 20:
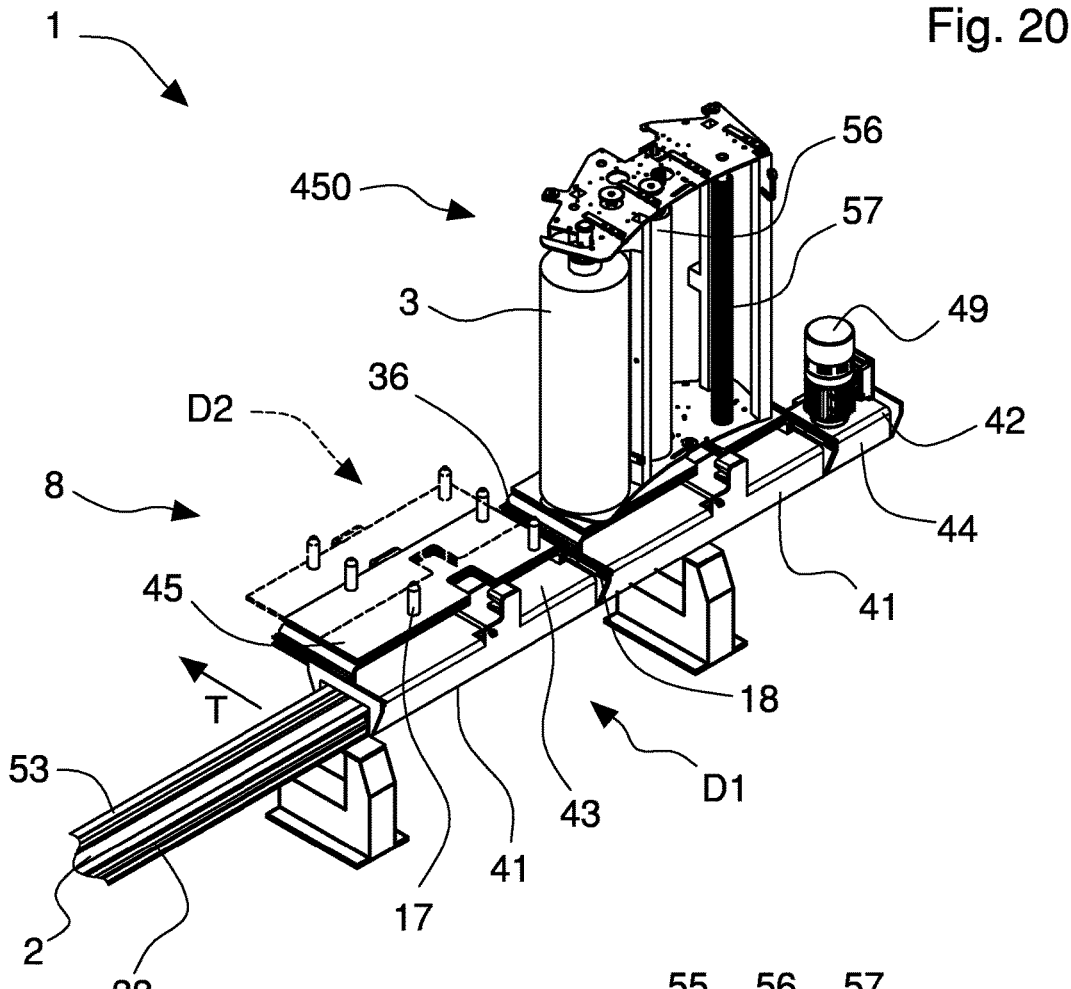
FIGS. 20 and 21 are, respectively, perspective and front views of another version of the movement system of the invention.
Figure 21:
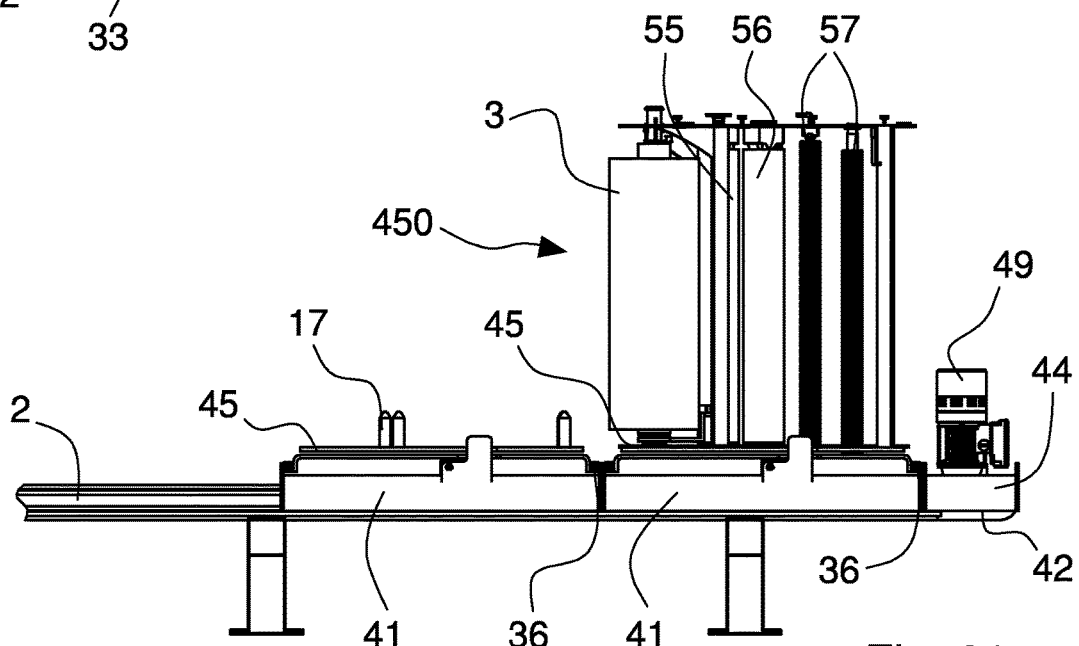

FIGS. 20 and 21 illustrate another version of the movement system 1 of the invention that differs from the embodiment previously disclosed and illustrated in FIGS. 1 to 6 by the plurality of shuttles that include, for example, one or more fourth shuttles devoid of driving devices (defined for convenience as fourth driven shuttles 41) and a shuttle provided with a driving device, but devoid of transfer devices for supporting an operating unit (defined for convenience as a driving shuttle 42). The fourth driven shuttles 41 and the driving shuttle 42 are movable along the guide 2 and connected together so as to form a fourth convoy 8 of shuttles. Each fourth driven shuttle 41 is arranged for supporting and moving at least one further unwinding unit 450. The latter includes a reel 3 of film and rollers 55, 56, 57 and is in this case devoid of driving motors of the prestretching rollers provided on the wrapping machine.

The fourth driven shuttle 41 includes a fourth carriage 43 provided with sliding wheels and configured for engaging and sliding on the guide 2. To the fourth carriage 43 a fourth transfer device 45 is connected that is suitable for housing and supporting an unwinding unit 50. The fourth transfer device 45 includes a fourth transfer platform fixed by telescopic guides 18 to end portions of the fourth carriage 43, in such a manner as to be movable between a respective retracted position D1 and a respective extended position D2 along the operating direction T driven by a linear actuator.

The fourth transfer device 45 is provided with a stop 17 suitable for engaging with the further unwinding unit 450 when the latter is positioned on the platform to prevent undesired movements thereof on a horizontal plane.

The fourth driven shuttles 41 are provided with brakes for stopping and locking the latter in defined operating positions along the guide 2.

The driving shuttle 42 includes a fifth carriage 44 to which a third driving device 49 is fixed, including, for example, an electric motor that rotates a gearwheel engaged on a rack fixed to the guiding means 2.

Alternatively, the electric motor of the third driving device 49 can drive a pulley or a gearwheel that is able to couple with a belt or chain fixed transmission systems of the guide 2 to move the driving shuttle 42.

Still alternatively, the driving device of the driving shuttle 42 can include a coupling device for coupling with belt or chain transmission systems moved along the path P by a motor, for example an electric motor, associated with the guide 2.

The driving device can be activated or deactivated for connecting or disconnecting the driving shuttle 42 to/from the transmission systems and enabling the movement or stopping thereof.

As the driving shuttle 42 is devoid of a transfer device, it supports no operating unit, but is intended only for moving the fourth convoy 8, i.e. the fourth driven shuttle 41 to which it is reversibly hooked. For this purpose, the driving shuttle 42 and the fourth driven shuttles 41 are provided with further hooks 36 for mutual reversible connecting.

It should be noted that the driving shuttle 42 can also be used for moving the convoys 5, 6 of the previously disclosed shuttles 11, 12, 21, 22. In this case the convoys 5, 6 can include only first driven shuttles 11 and second driven shuttles 21, respectively, in addition to respective driving shuttles 42.

Figure 22:
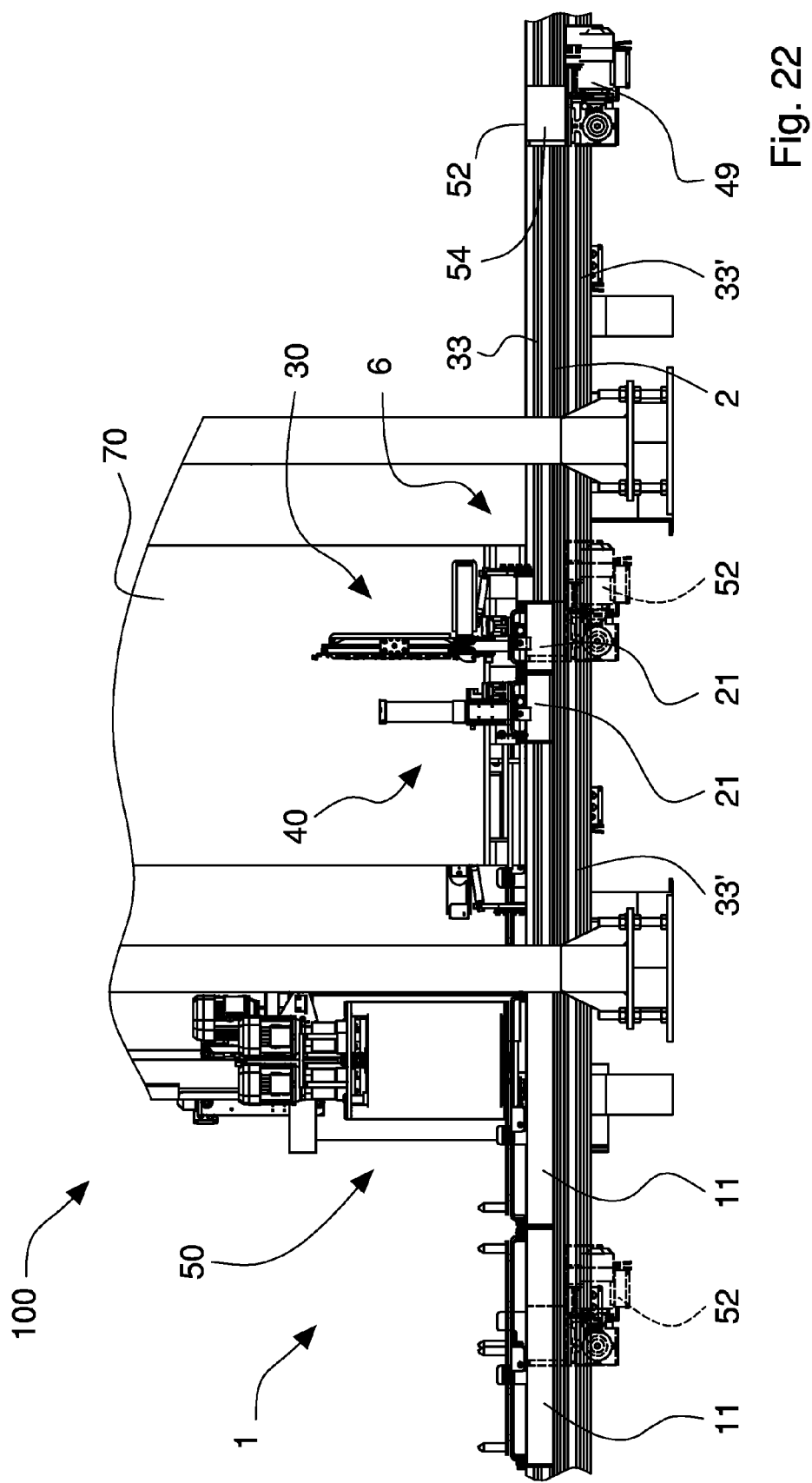
FIG. 22 is a front view of a further version of the movement system of the invention.

FIG. 22 illustrates a further version of the movement system 1 of the invention that differs from the embodiments previously described and illustrated by the plurality of shuttles that include first driven shuttles 11 and second driven shuttles 21, connected to form a first convoy 5 and a second convoy 6, respectively, and a shuttle provided with a respective driving device, but devoid of a transfer device for supporting an operating unit (defined for convenience as a further driving shuttle 52), the latter being able to slide freely along the guide 2 to connect and move a given convoy 5, 6 or a determined shuttle of the convoy. It should be noted that each convoy can be formed of one or more of the first driven shuttles 11 and/or second driven shuttles 21.

The shuttles can also form a single convoy.

The further driving shuttle 52 is slidably movable along a further rail 33' of the guide 2 which is fixed laterally to the beam 53 below one of the two rails 33 along which the first driven shuttles 11 and the second driven shuttles 12 slide. The further driving shuttle 52 is configured in such a manner as to pass underneath the driven shuttles 11, 21 from one end to the other of the beam 53 so as to be able to hook the shuttle 11, 21 which supports the operating unit 30, 40, 50 to be moved with the load 70 or to be moved to a set operating or inactive position.

The further driving shuttle 52 includes a further fifth carriage 54 to which the third driving means 49 is fixed.

The further driving shuttle 52 further includes another hook that is not illustrated that is activatable or deactivatable to enable the further driving shuttle 52 to be hooked to or unhooked from a driven shuttle 11, 21.

This version of the movement system 1 thus enables only driven shuttles 11, 21 (i.e. shuttles devoid of driving means) to be used to support the operating units 30, 40, 50, delegating to the further driving shuttle 52 (i.e. provided with driving means but devoid of transferring means for supporting an operating unit) the task of moving the operating units along the guide 2.

Figure 23:
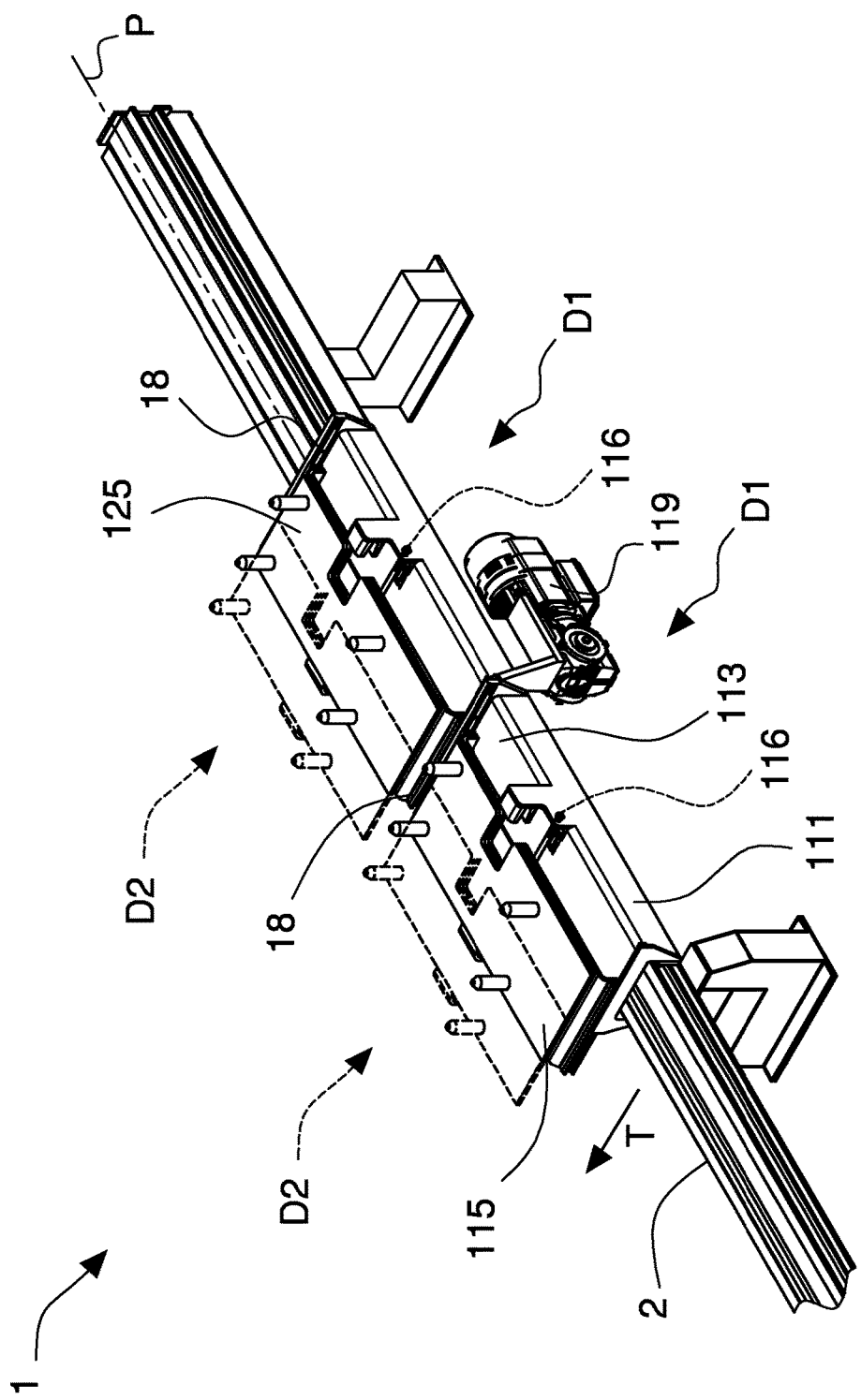
FIG. 23 is a front perspective view of still another version of the movement system of the invention.

FIG. 23 illustrates still another version of the movement system that differs from the embodiment disclosed above and shown in FIGS. 1 to 7 by only one shuttle, in particular a fifth shuttle 111, that forms a respective convoy and includes a transfer device 115 and a further transfer device 125 arranged for receiving and supporting respective operating units (that are not illustrated) and are movable independently and separated from one another along the operating direction T for moving the operating units towards or away from the load 70 and/or the film and/or the wrapping machine. In particular, the transfer devices 115, 125 are arranged for moving along the operating direction T the operating units and enabling the latter to interact and/or perform operations on the load 70 and/or on the film and/or on the wrapping machine.

The fifth shuttle 111 includes a fifth carriage 113 that is movable along the path P, is slidably engaged with the guide 2 and is arranged for slidably supporting the transfer device including a transfer platform 115 and a further transfer platform 125. The transfer platform 115 and the further transfer platform 125 are fixed by corresponding telescopic guides 18 to end portions of the carriage 113, in such a manner as to be movable between a retracted position D1 and an extended position D2 along the operating direction T. In the respective extended positions D2 of the transfer devices 115, 125 the operating units supported by the latter can interact and/or perform operations on the load and/or on the film and/or on the wrapping machine; in the retracted positions D1 of the transfer devices 115, 125 the operating units are positioned in such a manner as not to interfere with the load and/or the film and/or the wrapping machine.

A third actuator 116 is provided for moving independently and separately the transfer platforms 115, 125 along the operating direction T. The third actuator 116 includes, for example, pneumatic or electric linear actuators.

The fifth shuttle 111 is moved along the path P by a fifth driving device 119 in such a manner as to move the operating units between the operating positions in which the operating units can perform operations on the load and/or on the film and/or can interact with the wrapping machine, and the inactive positions in which the operating units are outside a working zone of the wrapping machine 100 in order not to interfere with operation thereof. Alternatively, the fifth shuttle 111 can be a driven shuttle that is movable along the guide 2 by one of the driving shuttles disclosed above.

The fifth shuttle 111 alone enables two operating units to be positioned in respective operating positions along the path P in such a manner that they can perform operations on the load 70 and/or on the film and/or on the wrapping machine 100.

In a further version of the movement system that is not shown in the figures, only one shuttle is provided with a plurality of transfer devices that is suitable for supporting and moving independently a plurality of respective operating units along the operating direction T. In particular, in this version the shuttle includes three or more transfer platforms fixed by corresponding telescopic guides to the carriage of the shuttle and driven by respective actuators.

The movement system 1 has been illustrated and disclosed by way of non-limiting example in association with a rotating-arm wrapping machine, but can be associated with, used and included in a wrapping machine with a double rotating arm, a wrapping machine with a vertical-axis or horizontal-axis rotating ring, and a wrapping machine with a rotating table.

The invention claimed is:

1. Apparatus for moving at least one operating unit of a machine for wrapping a load with a film, comprising
a shuttle assembly for supporting and moving at least one of said operating units along a path between an operating position in which said operating unit is operable on at least one of the load and the film and an inactive position in which said operating unit is beyond a working zone of the wrapping machine where said operating unit cannot interfere with the operation of the wrapping machine, said shuttle assembly comprising a plurality of shuffles that are connected to form a convoy of shuffles.

2. Apparatus as defined in claim 1, wherein said shuttle assembly includes a driving device for driving said shuttles along said path.

3. Apparatus as defined in claim 1, wherein at least one of said shuttles is supports at least one operating unit for movement along said path.

4. Apparatus as defined in claim 1, wherein each shuttle includes a hook for engaging a hook of an adjacent shuttle to connect and disconnect said shuttles.

5. Apparatus as defined in claim 1, wherein one of said shuttles includes a driving device for moving said convoy of shuttles along said path.

6. Apparatus as defined in claim 1, wherein each shuttle supports at least one operating unit.

7. Apparatus as defined in claim 4, wherein at least one shuttle includes a driving device and is arranged to hook another shuttle for moving said another shuttle along said path.

8. Apparatus as defined in claim 1, and further comprising a guide for supporting said shuttle assembly along said path, said guide traversing said working zone of the wrapping machine.

9. Apparatus as defined in claim 8, wherein said guide includes at least one beam having rails that support said shuttles for sliding movement along said path, said beam comprising a plurality of interconnected modules.

10. Apparatus as defined in claim 9, wherein said guide is rectilinear and parallel to an advancing direction of said path.

11. Apparatus as defined in claim 1, wherein said shuttle assembly further comprises transfer devices for receiving and supporting at least one of said operating units, said transfer devices being movable along a horizontal operating direction for moving said operating unit toward and away from one of the load, the film, and the wrapping machine.

12. Apparatus as defined in claim 1, wherein said operating unit comprises one of a first operating unit fir gripping, cutting and welding the film, a second operating unit for retaining the film, a third operating unit for unwinding the film, a fourth operating unit for labeling a load, a fifth operating unit for printing on the label, and a sixth operating unit for inserting load guards.

* * * * *